US006317650B1

(12) United States Patent
Powell et al.

(10) Patent No.: US 6,317,650 B1
(45) Date of Patent: Nov. 13, 2001

(54) SYSTEM AND METHOD EMPLOYING PORTABLE CARDS TO MONITOR A COMMERCIAL SYSTEM

(75) Inventors: Ken R. Powell, Athens, GA (US); Kevin W. Hartley, Marblehead, MA (US); Thomas M. Hintz, Indianapolis, IN (US); Eleanor B. Maxwell, Crawford, GA (US); Corey C. Snook, Meredith, NH (US)

(73) Assignee: SoftCard Systems, Inc., Watkinsville, GA (US)

( * ) Notice: Subject to any disclaimer, the term of this patent is extended or adjusted under 35 U.S.C. 154(b) by 0 days.

(21) Appl. No.: 09/301,748

(22) Filed: Apr. 29, 1999

(51) Int. Cl.[7] .......................... G06F 17/00; G06F 17/40; G06F 19/00

(52) U.S. Cl. ......................... 700/236; 700/231; 235/380; 235/381; 702/187; 702/188

(58) Field of Search ................................ 705/41, 14, 16, 705/20, 21, 22; 709/218–220, 219; 235/381, 380; 702/187, 188; 700/231, 236

(56) References Cited

U.S. PATENT DOCUMENTS

| | | | | |
|---|---|---|---|---|
| 4,001,550 | | 1/1977 | Schatz . | |
| 4,510,382 | * | 4/1985 | Walter | 235/380 |
| 4,959,788 | * | 9/1990 | Nagata et al. | 705/41 |
| 5,036,461 | * | 7/1991 | Elliott et al. | 705/44 |
| 5,091,713 | * | 2/1992 | Horne et al. | 340/541 |
| 5,276,312 | * | 1/1994 | McCarthy | 463/26 |
| 5,285,382 | * | 2/1994 | Muehlberger et al. | 705/17 |
| 5,303,844 | | 4/1994 | Muehlberger . | |
| 5,491,326 | | 2/1996 | Marceau et al. . | |
| 5,500,517 | | 3/1996 | Cagliostro . | |
| 5,520,275 | * | 5/1996 | Foglino | 194/217 |
| 5,526,409 | * | 6/1996 | Conrow et al. | 379/91.02 |
| 5,557,516 | | 9/1996 | Hogan . | |
| 5,559,887 | | 9/1996 | Davis et al. . | |
| 5,590,038 | * | 12/1996 | Pitroda | 705/41 |
| 5,694,323 | * | 12/1997 | Koropitzer et al. | 705/400 |
| 5,748,908 | * | 5/1998 | Yu | 705/44 |
| 5,869,826 | * | 2/1999 | Eleftheriou | 235/380 |
| 5,884,271 | * | 3/1999 | Pitroda | 705/1 |
| 5,997,170 | * | 12/1999 | Brodbeck | 700/236 |
| 6,056,194 | * | 5/2000 | Kolls | 235/381 |
| 6,119,934 | * | 9/2000 | Kolls | 235/381 |
| 6,181,981 | * | 1/2001 | Varga et al. | 700/236 |

FOREIGN PATENT DOCUMENTS

| | | | | |
|---|---|---|---|---|
| 2162665 | * | 7/1986 | (GB) | G06F/15/24 |
| 2083259 | * | 3/1982 | (GB) | G07F/7/00 |
| 362031233 | * | 2/1987 | (JP) | H04L/11/00 |
| WO90/01199 | * | 2/1990 | (WO) | G07F/7/02 |

OTHER PUBLICATIONS

Nicholson, Leslie, 'A Touch of the Future High–Tech Vending Machines will accept Payment by Credit Card.' Philadelphia Inquirer (PI), Mar. 2, 2000. Edition: SF, Section: Tech.life, p. F01. Dialog # 10562184.*

'Technology Firms Make Vending Machines Links to E–Commerce', Philadelphia Inquirer, Mar. 2, 2000, Retrieved from: Dialog file: 09: Business & Industry ®. Dialog Accession # 02737639.*

Nicholson, Leslie, 'Vending the Rules Machines may bring dot–com to the masses', Knight Rider tribune, dDnver Post, Mon1 Ed, p. E–08, Apr. 10, 2000. Dialog file: 387: The Denver Post, # 01025716.*

* cited by examiner

*Primary Examiner*—Eric W. Stamber
*Assistant Examiner*—James W. Myhre
(74) *Attorney, Agent, or Firm*—Jerome D. Jackson

(57) ABSTRACT

A system and method employing portable cards, carried by consumers, to monitor a commercial system. In one exemplary embodiment, when a consumer uses a card at a vending machine, the vending machine may write data, reflecting a condition of the vending machine, onto the card. Subsequently, when the consumer uses the card at another machine, the other machine may read the condition data from the card.

104 Claims, 27 Drawing Sheets

1000

3002

3004

| | | | | |
|---|---|---|---|---|
| 3656 | 01707542312 | 2 | 20 | 0935 |
| 0054 | 01705424943 | 0 | 75 | 1389 |
| 1317 | 01703149873 | 0 | 50 | 0067 |

947

Fig. 16

| | |
|---|---|
| 1317 | 0073 |
| 0054 | 1390 |
| 3656 | 0939 |

8435

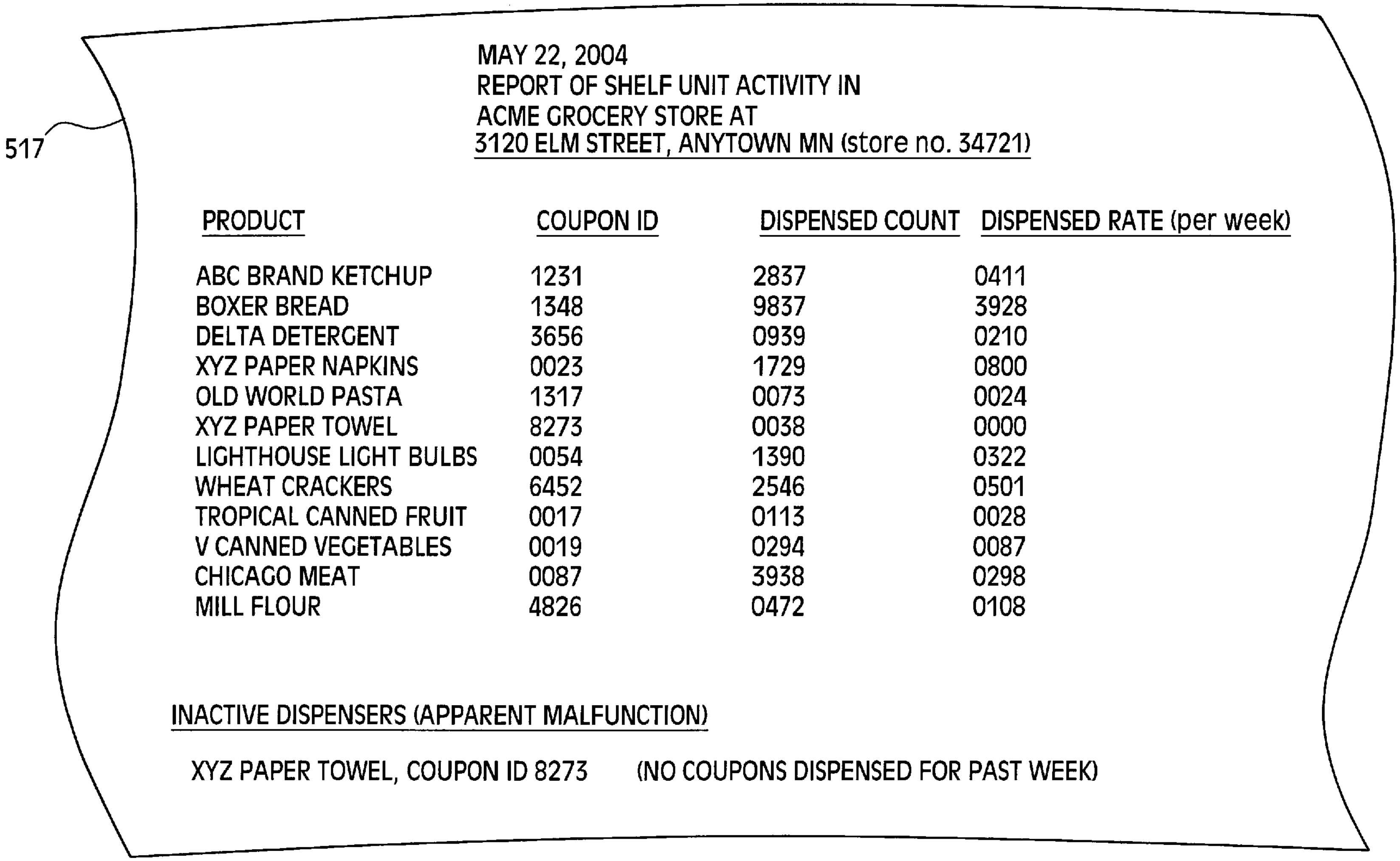

MAY 22, 2004
REPORT OF SHELF UNIT ACTIVITY IN
ACME GROCERY STORE AT
3120 ELM STREET, ANYTOWN MN (store no. 34721)

| PRODUCT | COUPON ID | DISPENSED COUNT | DISPENSED RATE (per week) |
|---|---|---|---|
| ABC BRAND KETCHUP | 1231 | 2837 | 0411 |
| BOXER BREAD | 1348 | 9837 | 3928 |
| DELTA DETERGENT | 3656 | 0939 | 0210 |
| XYZ PAPER NAPKINS | 0023 | 1729 | 0800 |
| OLD WORLD PASTA | 1317 | 0073 | 0024 |
| XYZ PAPER TOWEL | 8273 | 0038 | 0000 |
| LIGHTHOUSE LIGHT BULBS | 0054 | 1390 | 0322 |
| WHEAT CRACKERS | 6452 | 2546 | 0501 |
| TROPICAL CANNED FRUIT | 0017 | 0113 | 0028 |
| V CANNED VEGETABLES | 0019 | 0294 | 0087 |
| CHICAGO MEAT | 0087 | 3938 | 0298 |
| MILL FLOUR | 4826 | 0472 | 0108 |

INACTIVE DISPENSERS (APPARENT MALFUNCTION)

XYZ PAPER TOWEL, COUPON ID 8273 (NO COUPONS DISPENSED FOR PAST WEEK)

Fig. 21

IP ADDRESS FOR
FOR COMPUTER IN
AUDIT SITE 135
&
TCP PORT NUMBER

MACHINE ID 321
&
TIME-DATE 322

CURRENCY RECEIPT 316
CURRENCY RECEIPT 317
CURRENCY RETURN 324
DISPENSED COUNT ARRAY 327

34

Fig. 27

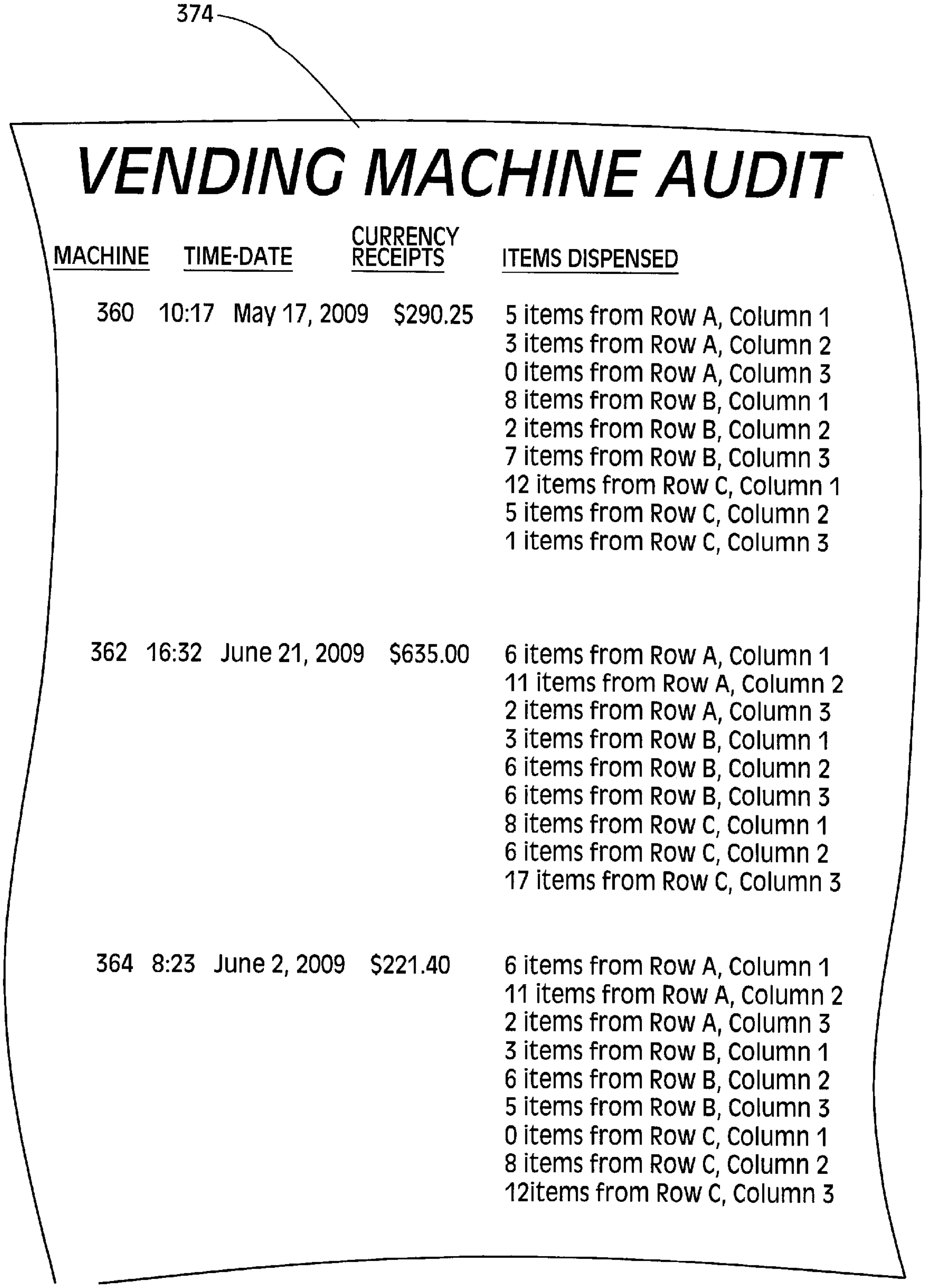

VENDING MACHINE AUDIT

| MACHINE | TIME-DATE | CURRENCY RECEIPTS | ITEMS DISPENSED |
|---|---|---|---|
| 360 | 10:17 May 17, 2009 | $290.25 | 5 items from Row A, Column 1<br>3 items from Row A, Column 2<br>0 items from Row A, Column 3<br>8 items from Row B, Column 1<br>2 items from Row B, Column 2<br>7 items from Row B, Column 3<br>12 items from Row C, Column 1<br>5 items from Row C, Column 2<br>1 items from Row C, Column 3 |
| 362 | 16:32 June 21, 2009 | $635.00 | 6 items from Row A, Column 1<br>11 items from Row A, Column 2<br>2 items from Row A, Column 3<br>3 items from Row B, Column 1<br>6 items from Row B, Column 2<br>6 items from Row B, Column 3<br>8 items from Row C, Column 1<br>6 items from Row C, Column 2<br>17 items from Row C, Column 3 |
| 364 | 8:23 June 2, 2009 | $221.40 | 6 items from Row A, Column 1<br>11 items from Row A, Column 2<br>2 items from Row A, Column 3<br>3 items from Row B, Column 1<br>6 items from Row B, Column 2<br>5 items from Row B, Column 3<br>0 items from Row C, Column 1<br>8 items from Row C, Column 2<br>12items from Row C, Column 3 |

Fig. 29

SYSTEM AND METHOD EMPLOYING PORTABLE CARDS TO MONITOR A COMMERCIAL SYSTEM

BACKGROUND OF THE INVENTION

1. Field of the Invention

This invention relates generally to monitoring a commercial system and, more particularly, to a system and method employing portable cards to monitor a commercial system.

2. Description of Related Art

Machines for providing articles or service to a consumer are known. Such machines include vending machines for dispensing merchandise, cash machines for dispensing cash, and various types of game machines that may dispense prizes. Such machines require maintenance from time to time, to replenish inventory, to collect from currency bins, or to repair. The cost of monitoring such machines, for timely maintenance of the machines, can be a substantial cost of doing business.

SUMMARY OF THE INVENTION

It is an object of the present invention to provide an improved system and method for monitoring a commercial system.

To achieve this object and other objects of the present invention, there is a method for a system including a first person, a second person, a card transported by the second person, and a first system. The method comprises the steps, performed by the first system, of performing a first transaction, the first transaction being for transferring title to a first item to the first person; subsequently, beginning a second transaction and communicating a first signal with the card, the second transaction being for transferring title to a second item to the second person; and writing a second signal onto the card, the second signal corresponding to a condition of the first system, the condition resulting from the first transaction.

According to another aspect of the present invention, there is a method for a system including a first person, a second person, a card transported by the second person, a first system, and a second system. The method comprises the steps, performed by the second system, of beginning a transaction for the second person by communicating a first signal with the card, the transaction being for transferring title to an item to the second person; and reading a second signal from the card, the second signal corresponding to a condition of the first system, the condition resulting from a previous transaction between the first system and the first person.

According to yet another aspect of the present invention, there is a system for operating with first and second persons, and a card transported by the second person. The system comprises logic that performs a first transaction, the first transaction being for transferring title to a first item to the first person, and subsequently begins a second transaction and communicates a first signal with the card, the second transaction being for transferring title to a second item to the second person, and a writer for writing a second signal onto the card, the second signal corresponding to a condition of the system, the condition resulting from the first transaction.

According to yet another aspect of the present invention, there is a system for operating with first and second persons, and a card transported by the second person. The system comprises logic that begins a transaction for the second person by communicating a first signal with the card, the transaction being for transferring title to an item to the second person; and a reader that reads a second signal from the card, the second signal corresponding to a condition of another system, the condition resulting from a previous transaction between the other system and the first person.

According to yet another aspect of the present invention, there is a method for a system including a first person, a second person, a card transported by the second person, and a first system. The method comprises the steps, performed by the first system, of performing a first purchase transaction for the first person; subsequently, beginning a second purchase transaction for the second person and communicating a first signal with the card; and writing a second signal onto the card, the second signal corresponding to a condition of the first system, the condition resulting from the first purchase transaction.

According to yet another aspect of the present invention, there is a method for a system including a first person, a second person, a card transported by the second person, a first system, and a second system. The method comprises the steps, performed by the second system, of beginning a purchase transaction for the second person by communicating a first signal with the card; and reading a second signal from the card, the second signal corresponding to a condition of the first system, the condition resulting from a previous purchase transaction between the first system and the first person.

According to yet another aspect of the present invention, there is a system for operating with first and second persons, and a card transported by the second person. The system comprises logic that performs a first purchase transaction for the first person, and subsequently begins a second purchase transaction for the second person and communicates a first signal with the card; and a writer for writing a second signal onto the card, the second signal corresponding to a condition of the system, the condition resulting from the first purchase transaction.

According to yet another aspect of the present invention, there is a system for operating with first and second persons, and a card transported by the second person. The system comprises logic that begins a purchase transaction for the second person by communicating a first signal with the card; and a reader that reads a second signal from the card, the second signal corresponding to a condition of another system, the condition resulting from a previous purchase transaction between the other system and the first person.

BRIEF DESCRIPTION OF THE DRAWINGS

FIG. 16 represents a table employed by the checkout station to process coupon redemptions.

FIG. 21 is a report printed by the headquarter site, in response to receiving shelf unit dispensed count data.

FIG. 27 is a chart of a record written by the vending machine and stored on card 215'.

FIG. 29 is a diagram of a paper report generated by the audit site of FIG. 31.

The accompanying drawings which are incorporated in and which constitute a part of this specification, illustrate embodiments of the invention and, together with the description, explain the principles of the invention, and additional advantages thereof. Throughout the drawings, corresponding elements are labeled with corresponding reference numbers.

DESCRIPTION OF THE PREFERRED EMBODIMENTS

First Preferred Embodiment

Figure 1:
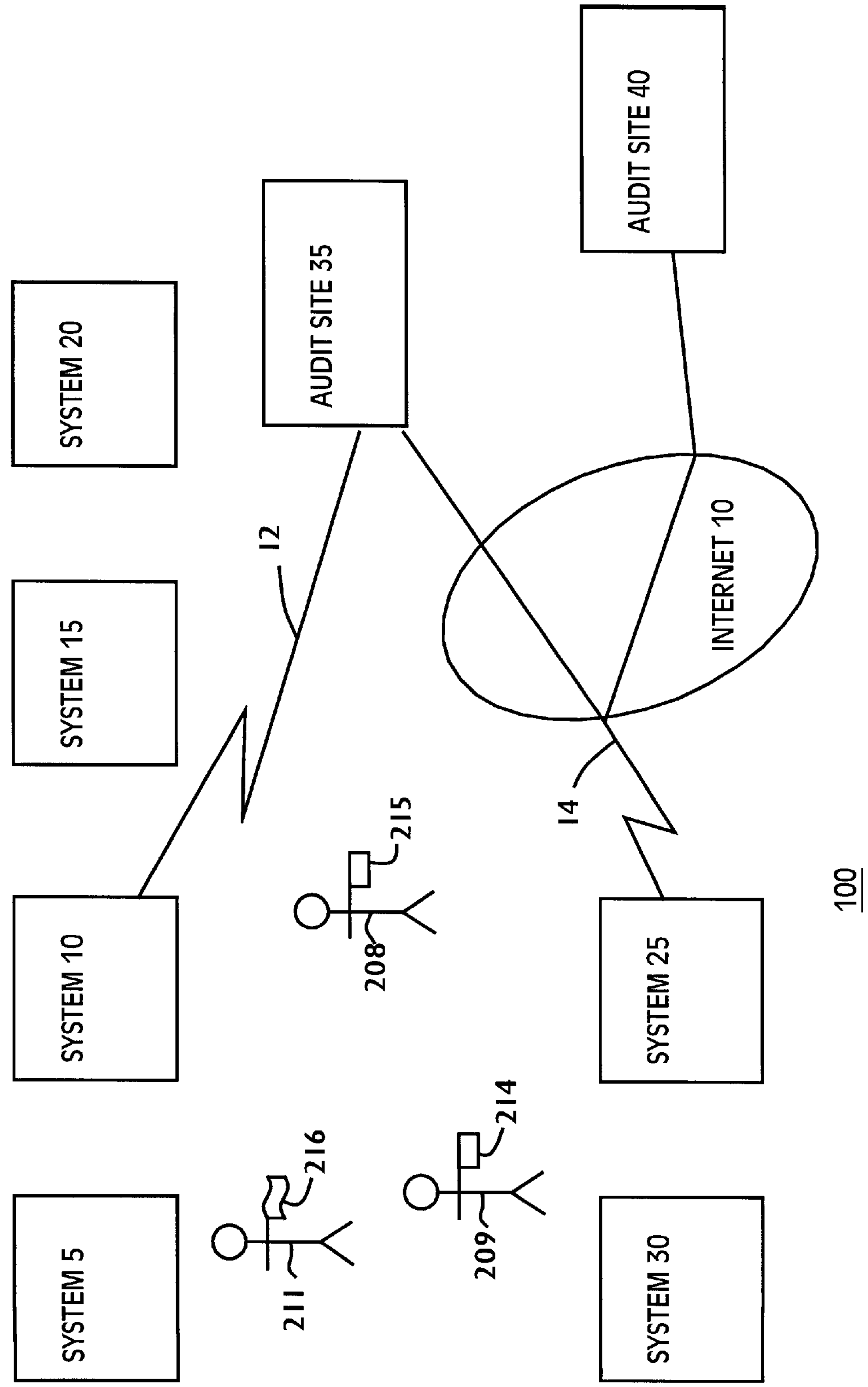
FIG. 1 is a diagram of a system in accordance with a first preferred embodiment of the present invention.

FIG. 1 shows a system 100 in accordance with the first preferred embodiment of the present invention. System 100 includes system 5, system 10, system 15, system 20, system 30, system 25, audit site 35, and audit site 40. Customer 209 carries a portable card 214 for enabling transactions with one of systems 5, 10, 15, 20, 30, and 25. Customer 208 carries a portable card 215 for enabling transactions with two or more of system 5, 10, 15, 20, 30, and 25. Customer 211 carries paper currency 216 for enabling transactions with one of systems 5, 10, 15, 20, 30, and 25.

Each of systems 5, 10, 15, 20, 25 and 30 may include, for example, a vending machine, a game machine, electronic transaction machine, or a computer network with multiple point-of-sale (POS) terminals in a store. Each of systems 5, 10, 15, 20, 30, and 25 has circuitry for communicating with portable cards such as card 214 and card 215. In this Patent Application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array.

Some of the systems such as system 5, system 15, system 20, and system 30 are isolated without a coupling to a wide area communication path, such as a WAN backbone, telephone line, ISDN line, or radio link. Other systems, such as system 10 and system 25 are connected with wide area communication paths. System 10 has a communication path to audit site 35 via a modem and telephone link 12. System 25 has a communication path to both audit site 35 and audit site 40 via ISDN line 14 and Internet 10.

Customer card 215 stores signals for customer 208, and may have a unique identifier associated with customer 208. Signals stored on card 215 may include electronic currency or discount coupons, for example.

Customer 208 may present her card 215 to an isolated system, such as system 15. System 15 uses a contactless technique to detect and communicate with card 215, without touching card 215. In response to detecting card 215, system 15 performs a transaction with customer 208. System 15 also writes data about the condition of system 15 onto card 215. Subsequently, customer 208 may present card 215 at a wide-area-connected system, such as system 10. System 10 uses a contactless technique to detect and communicate with card 215, without touching card 215. In response to detecting card 215, system 10 performs a transaction with customer 208.

System 10 also reads the data about the condition of system 15 from card 215. Subsequently, system 10 sends the condition data for system 15 to audit site 35, via telephone line 14 and Internet 10. System 10 also erases the data, about the condition of system 15, from card 215; system 10 deallocates the memory space used to store the condition of system 15 on card 215.

System 10 is spatially removed from system 15, and a processor in site 35 is spatially removed from systems 10 and 15.

Thus, a service worker need only be dispatched to system 15 when condition data, transmitted via customer cards, indicates system 15 needs service, or if for some reason there is an absence of condition data from customer cards.

Figure 2:
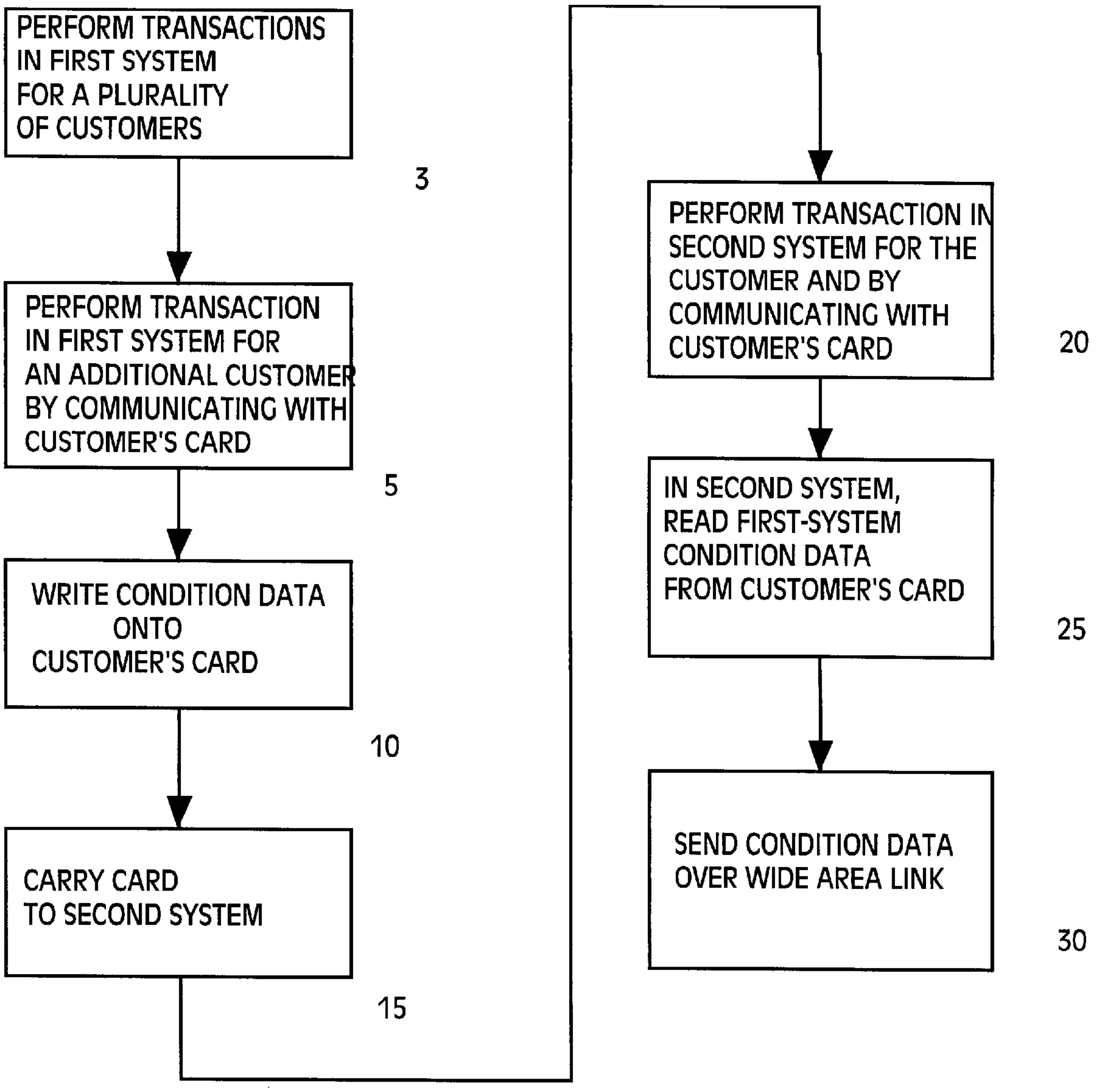
FIG. 2 is a flow chart of a process performed by the first embodiment preferred of the invention.

FIG. 2 shows a process performed by system 100 shown in FIG. 1. System 100 performs transactions in a first system for a plurality of customers. (step 3). For example, system 100 may perform transactions in system 30 for customers 211 and customers 209.

Subsequently, system 100 performs a transaction in the first system for an additional customer by communication with the customer's card. (step 5). For example, system 100 may perform a transaction in system 30 for customer 208 by communicating with card 215.

Subsequently, from the first system, system 100 writes first-system condition data onto the card of the additional customer. The first-system condition data is a result of transactions with the plurality of customers. (step 10). The additional customer moves the card to a second system. (step 15). For example, customer 208 could then carry her card 215 to system 10.

The second system communicates with the card to perform another transaction. (step 20). For example, system 10 could deduct electronic currency from card 215 in exchange for giving customer 208 merchandise.

The second system also reads the first-system condition transaction-related data from the first card. (step 25). For example, system 10 would also read condition data describing system 30 from card 215.

System 100 then sends the first-system condition data over a wide band communication link. (step 30). For example, system 10 sends the condition data for system 30 to audit site 35 via WAN telephone link 12.

Second Preferred Embodiment

Figure 3:
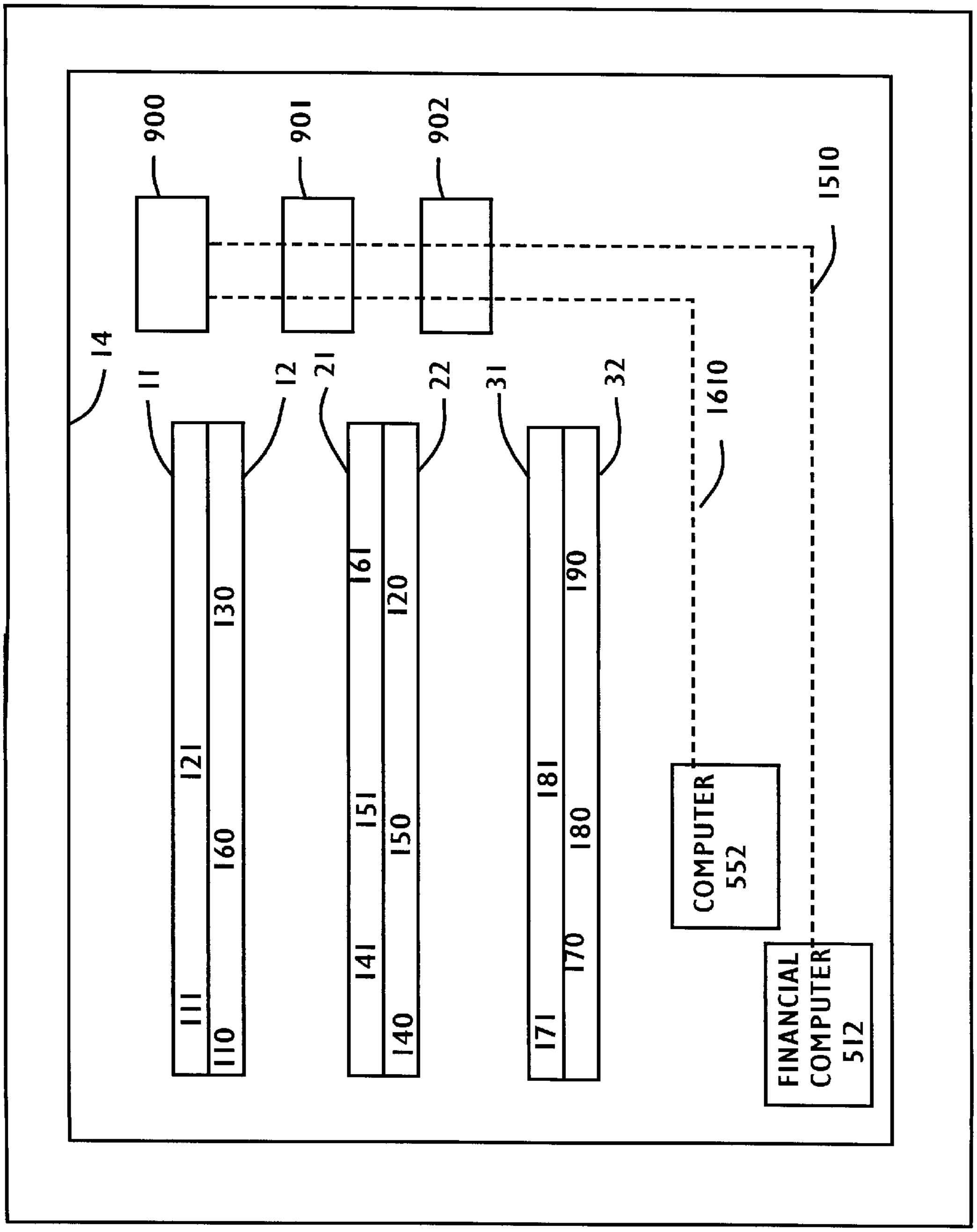
FIG. 3 is a plan view of a retail store in accordance with a second preferred embodiment of the present invention.
Figure 4A:
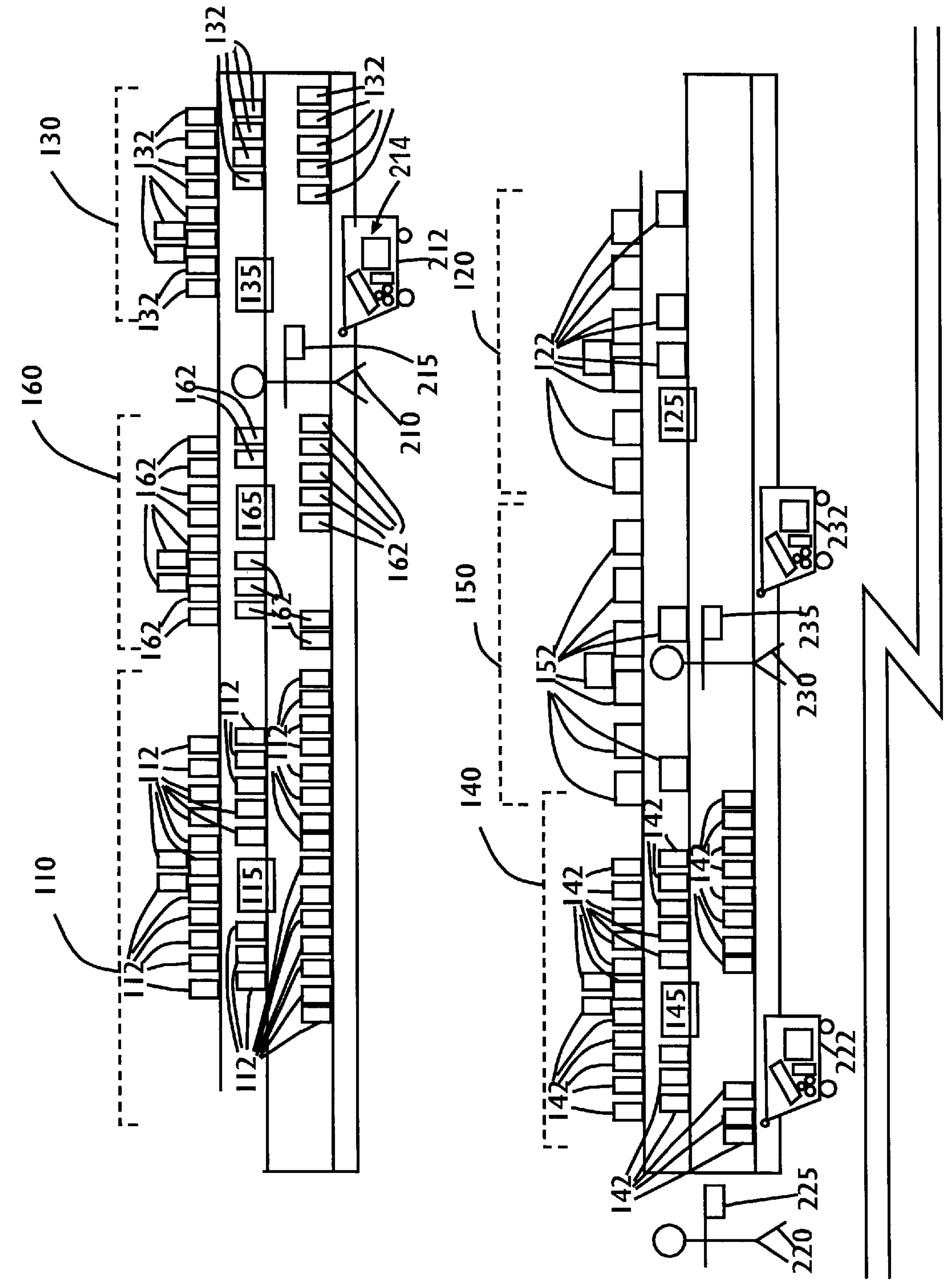
FIGS. 4A and 4B are another type of view of a part of the retail store.
Figure 4B:
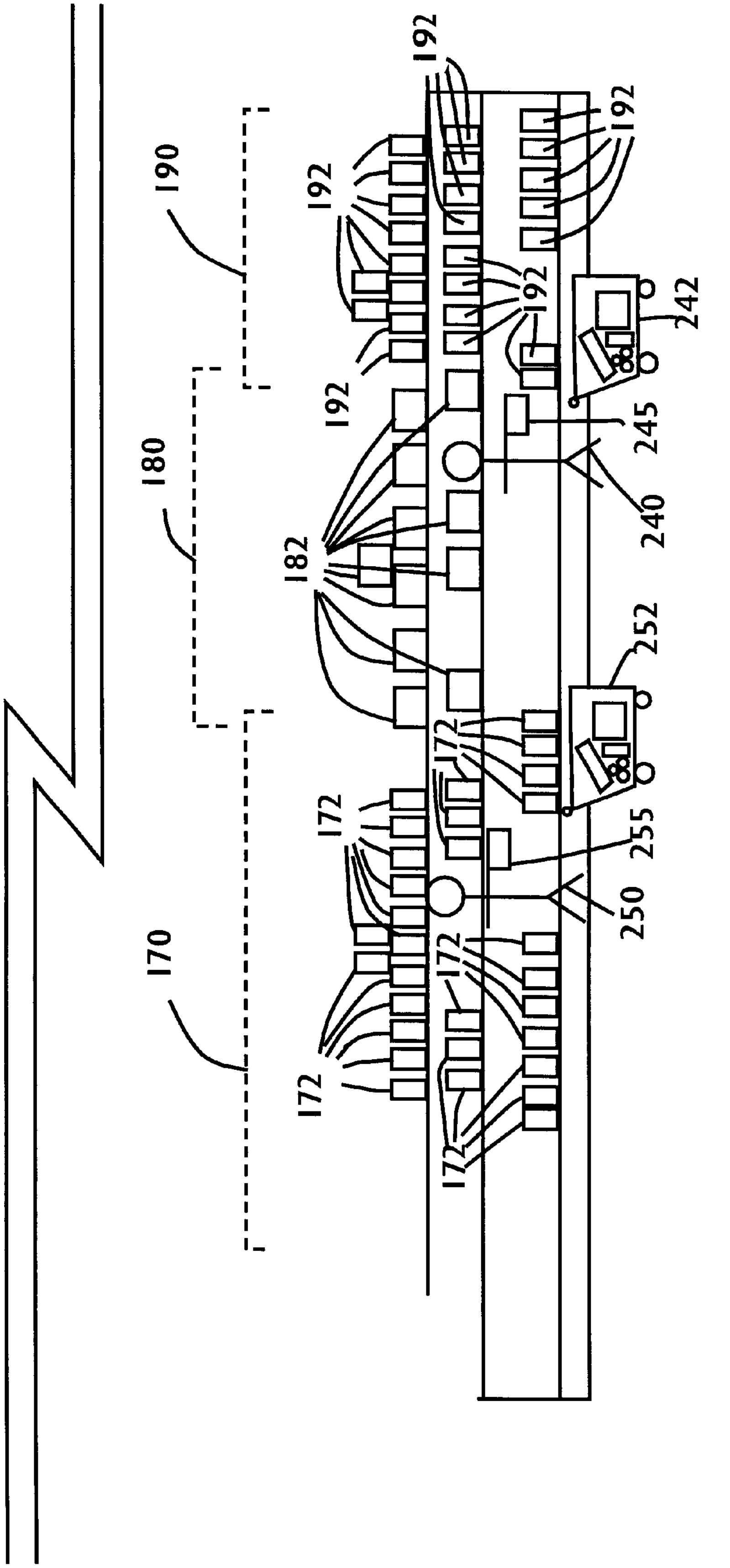

FIG. 3 shows a plan view of store 1000 in accordance with a second preferred embodiment of the present invention. Shelves 11, 12, 21, 22, 31, and 32 include product areas 111, 121, 110, 120, 130, 141, 151, 161, 140, 150, 160, 171, 181, 170, 180, and 190. Each product area includes a plurality of a respective product. Customers shop in store 1000, by removing products from the shelves and bringing the products to one of the checkout station 900, 901, or 902. Some computers in checkout stations 900, 901, 902 communicate with financial computer 512 via computer network cable 1510. Other computers in checkout stations 900, 901, 902 communicate with computer 552 via computer network cable 1610.

FIGS. 4A, 4B, 10A and 10B are each a partial view of store 1000. Customers 210, 220, 230, 240, 250, 270, 280, and 290, shop in store 1000. Store 1000 has a plurality of product areas, each corresponding to a respective product. Product Area 110 has Delta brand detergent. Product Area 120 has Old World brand pasta. Product Area 130 has Lighthouse brand light bulbs.

Some of the product areas have a respective shelf unit for writing an electronic coupon onto a customer card. Product Area 110 has Shelf unit 115. Product Area 120 has Shelf unit 125. Product Area 130 has Shelf unit 135.

More specifically, Product Area 110 has bottles of detergent 112 grouped together on multiple shelves. Bottles of detergent 112 are contiguously grouped, meaning that no other product is between any two bottles of detergent 112. No other product is between shelf unit 115 and bottles of detergent 112. Shelf unit 115 is on a shelf under some of the bottles 112 and over some of the bottles 112. In other words, Shelf unit 115 is adjacent to bottles 112 and supported by a shelf that is in vertical alignment with some of the bottles 112.

Figure 5A:
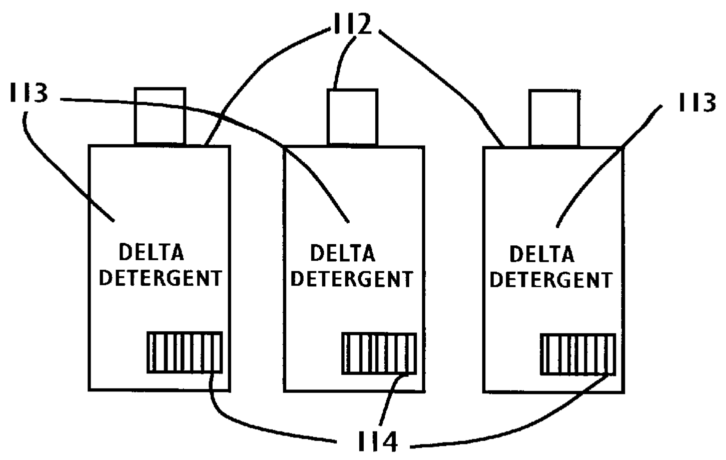
FIGS. 5A, 5B, and 5C are enlarged views of some products shown in FIGS. 4A and 4B.

FIG. 5A shows an enlarged view of some of the bottles of detergent 112. Each bottle of detergent has a common Universal Product Code (UPC) symbol 114. Symbol 114 encodes a 12-digit number that is part of a product identification system documented by the Uniform Code Council, Inc., Dayton, Ohio. In UPC Product Code format, the first digit is a 0, designating a product. The next five digits are a manufacturer ID. The next 5 digits are an item number. The last digit is a check digit.

Each UPC symbol 114 is a group of parallel lines that encodes a number (0 17075 00003 3) that uniquely identifies Delta Detergent. In other words, symbol 114 is different from UPC symbols of units of other products. Each bottle of detergent 112 also has a common character label 113 that verbally describes the product. Character label 113 is "DELTA DETERGENT." Label 113 is different from labels of units of other products.

Figure 5B:
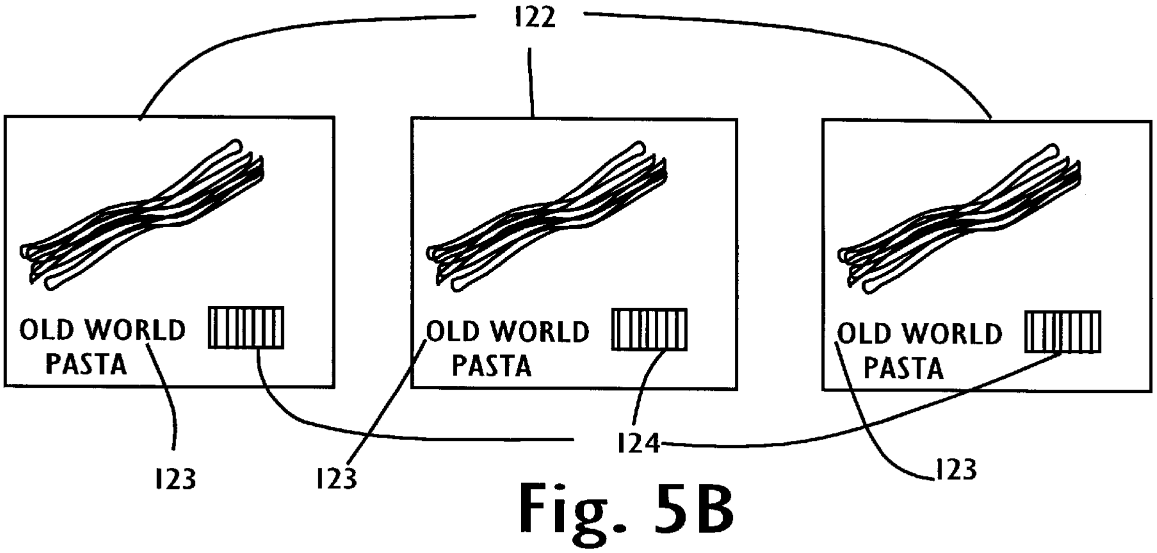

Product Area 120 has boxes of Old World brand pasta 122 contiguously grouped together on multiple shelves. FIG. 5B shows an enlarged view of some of the boxes of pasta 122. Each box of pasta 122 has a common UPC symbol 124, which is a group of parallel lines that encodes a number (0 17031 00005 3) that uniquely identifies Old World pasta. In other words, symbol 124 is different from UPC symbols of units of other products. Each box of pasta 122 also has a common character label 123 that verbally describes the product. Character label 123 is "OLD WORLD PASTA." Label 123 is different from labels of units of other products.

Figure 5C:
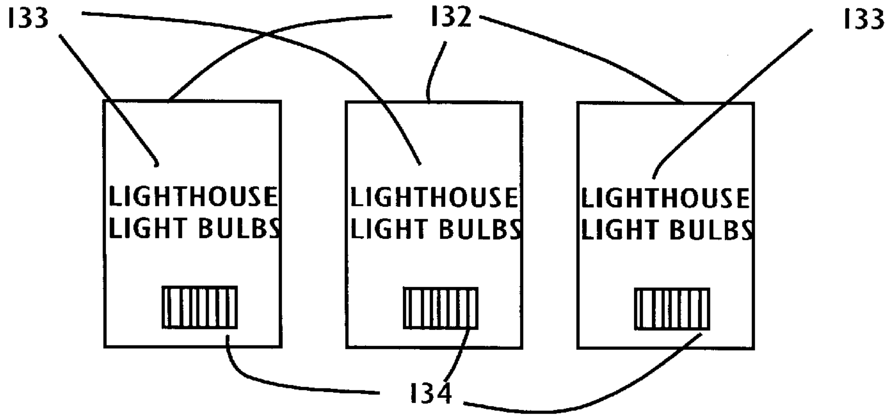

Product Area 130 has boxes of Lighthouse brand light bulbs 132 grouped together on multiple shelves. FIG. 5C shows an enlarged view of some of the boxes of light bulbs 132. Each box of light bulbs 132 has a common UPC symbol 134, which is a group of parallel lines that encode a number (0 17054 1017 6) that uniquely identifies Lighthouse light bulbs. In other words, symbol 134 is different from UPC symbols of other products. Each box 132 also has a common character label 133 that verbally describes the product. Character label 133 is "LIGHTHOUSE LIGHT BULBS." Label 133 is different from labels of other products.

Similarly, other product areas in store 1000 each have a set of respective products contiguously grouped together. Respective units of a certain product have a common UPC symbol, different from UPC symbols on units of other products, that uniquely identifies the certain product. Respective units of a certain product have a common label, different from labels on units of other products, that uniquely identifies the certain product. Product area 140 has bottles of ABC brand ketchup 142 contiguously grouped together, and shelf unit 145. Product area 150 has boxes of Fido brand dog food 152 contiguously grouped together, and no shelf unit. Product area 160 has loaves of Boxer brand bread 162 contiguously grouped together, and shelf unit 165. Product area 170 has cartons of Clover brand milk 172 contiguously grouped together, and no shelf unit. Product area 180 has packages of Chicago brand bacon 182, and no shelf unit. Product area of 190 has packages of Clover brand butter 192 contiguously grouped together, and no shelf unit. Product area 111 has boxes of XYZ brand paper napkins contiguously grouped together. Product area 121 has rolls of XYZ brand paper towel contiguously grouped together. Product area 141 has boxes of Wheat brand crackers contiguously grouped together. Product area 151 has Tropical brand canned fruit contiguously grouped together. Product area 161 has V brand canned vegetables contiguously grouped together. Product area 171 has cans of Chicago brand meat contiguously grouped together. Product area 181 has boxes of Mill brand flour contiguously grouped together.

To receive an electronic coupon in the store, a customer inserts her respective card into the shelf unit adjacent to a product the customer wishes to purchase, and the shelf unit then writes an electronic coupon onto the card. In other words, the shelf unit writes an electronic coupon into a memory on the card, in response to a person presenting the card at the shelf unit.

The customer then removes the product from the shelf and places the removed product into her cart.

Figure 6A:
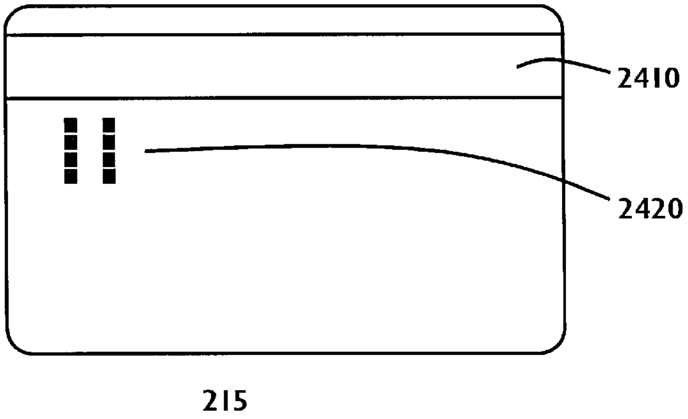
FIG. 6A is a plan view of one of the customer cards shown in FIGS. 4A and 4B.
Figure 6B:
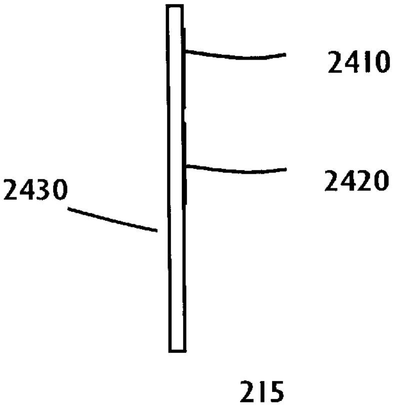
FIG. 6B is a side view of the card shown in FIG. 6A.

FIG. 6A shows a plan view of customer card 215 carried by customers 210, and FIG. 6B shows a side view of card 215. Card 215 is 8.5 cm by 5.4 cm, the length and width of a typical financial credit card. Card 215 is slightly thicker than a typical financial credit card. Card 215 includes a magnetic stripe 2410, interface contacts 2420 for communication with the checkout station, and embossed area 2430 for displaying the card owner's name. Magnetic stripe 2410 allows a conventional credit card stripe reader to read basic data from the card. Magnetic stripe 2410 is not necessary to the operation of the preferred embodiment of the invention.

Figure 6C:
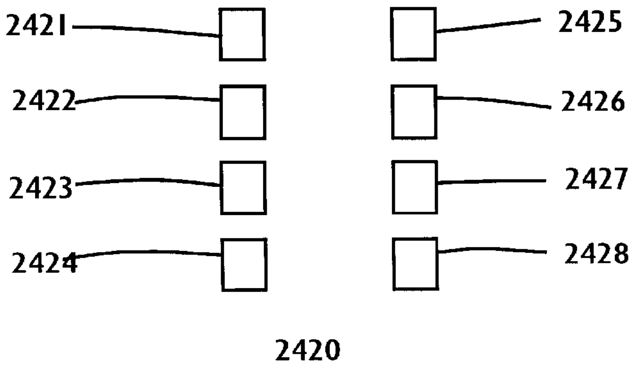
FIG. 6C is an enlarged, partial view of the card shown in FIG. 6A.

FIG. 6C shows interface contacts 2420 in more detail. Interface contacts 2420 are configured in accordance with ISO 7816-2: 1988(E), Identification cards—Integrated circuit (s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (programming voltage), contact 2427 is assigned to I/O (data input/output), and contact 2428 is reserved for future use. Card 215 communicates with the checkout stations through contact 2427 using a half duplex scheme, meaning that contact 2427 is for communicating data signals either to or from the card.

Figure 7:
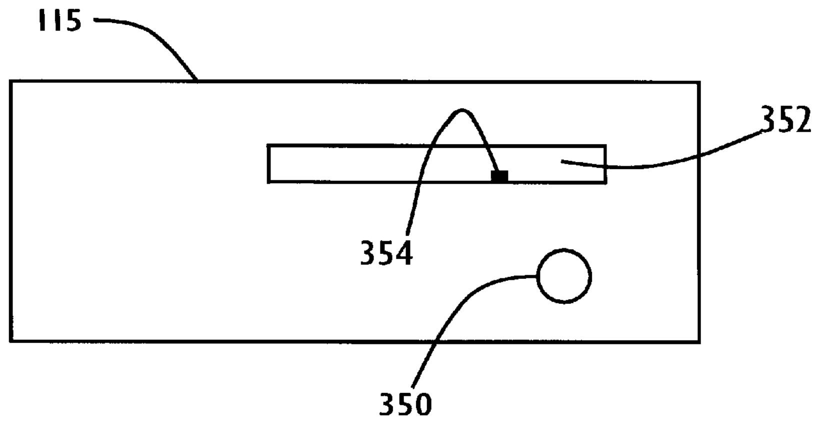
FIG. 7 is a drawing of a shelf unit shown in FIG. 4A.

FIG. 7 shows shelf unit 115, including green light 350, and interface slot 352. Shelf unit 115 has no external wires connecting shelf unit 115 to another device. Interface slot 352 has a width sufficient to accommodate the width of one of the customer cards. When a customer card is in interface slot 352, conductive contact 354 inside interface slot 352 touches contact 2427 on the customer card. Interface slot 352 has other contacts (not shown) for touching the other card contacts 2420.

Figure 8:
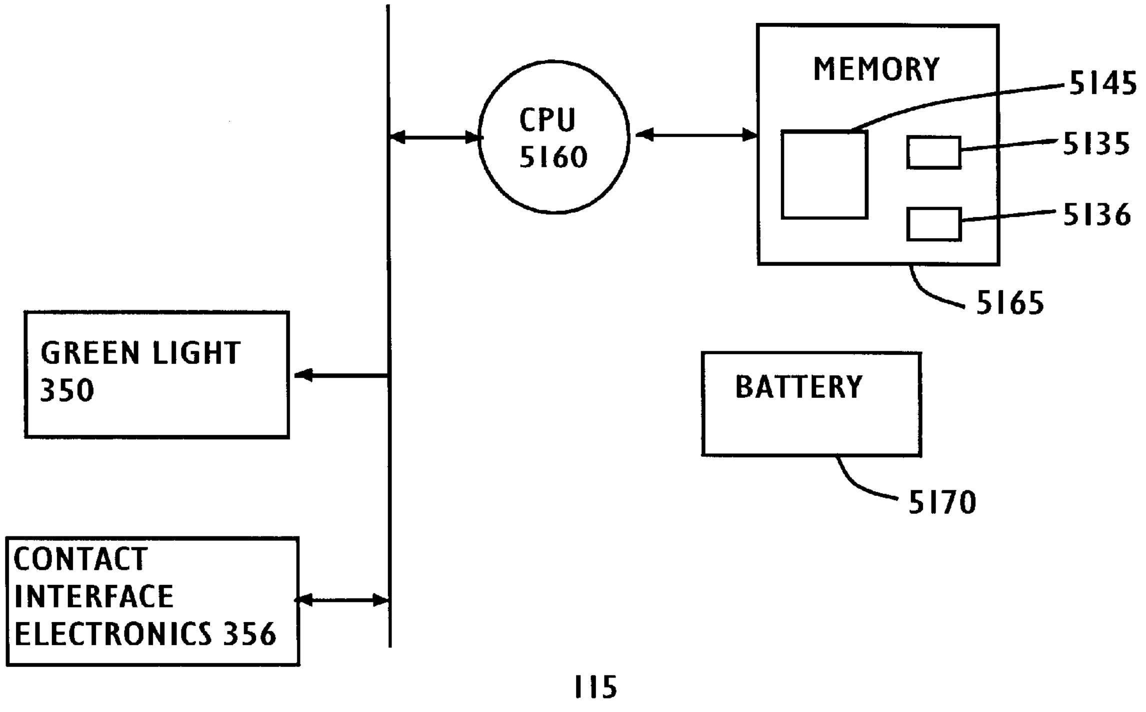
FIG. 8 is a block diagram of the shelf unit shown in FIG. 7.

FIG. 8 shows a block diagram of shelf unit 115, including central processing unit 5160, nonvolatile memory 5165, and battery 5170. Memory 5165 stores program 5145, executed by CPU 5160, and coupon ID 5135 and a dispensed count 5136 (COUNT). Memory 5165 is a random access, addressable device.

Figure 9:
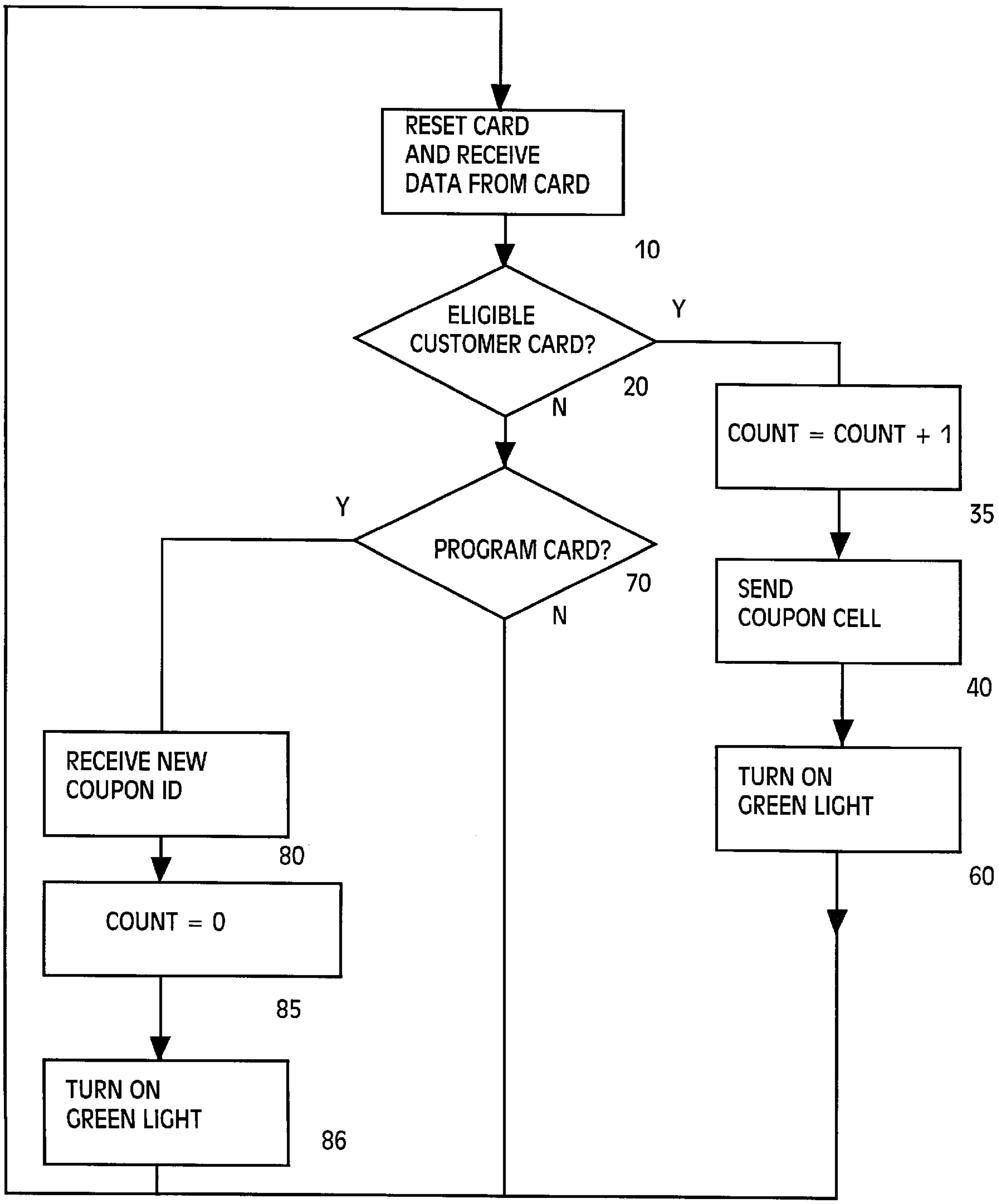
FIG. 9 is a flow chart of a process performed by the shelf unit shown in FIGS. 7 and 8.

FIG. 9 shows a processing performed by processor 5160 and program 5145 in shelf unit 115. CPU 5160 and a program in memory 5165 act to perform the processing shown in FIG. 9. When a person inserts a card into interface slot 352 a switch (not shown) in interface slot 352 alerts CPU 5160 that a card has been inserted into the slot. Subsequently, CPU 5160 causes contact interface electronic 356 to reset the card. CPU 5160 then receives a record from the card (step 10).

CPU 5160 analyzes the received record to determine whether the card is a customer card that is eligible to receive paperless coupons in store 1000 (step 20). If the card is an eligible customer card, CPU 5160 increments the value of COUNT (step 35), and sends to the customer card a record containing a coupon cell. The coupon cell includes an identification code (coupon ID 5135) for the product currently being promoted by the shelf unit (bottles of delta detergent 112), and a 2-byte count of coupons dispensed from a particular shelf unit during the current promotion (COUNT 5136). (step 40).

CPU 5160 then turns on green light 350 to indicate to the customer that an electronic coupon has successfully been transferred to her customer card (step 60), thereby allowing the customer to conveniently verify whether she is eligible for a discount before selecting the product.

If the card is not an eligible customer card but is instead a program card (step 70), CPU 5160 receives a new value for coupon ID 5135 from the program card, thereby changing the electronic coupon dispensed by the shelf unit. (step 80). A type of system program card is a subject of copending application of KEN R. POWELL, ELEANOR B. MAXWELL, and COREY C. SNOOK for SYSTEM AND METHOD EMPLOYING A PORTABLE CARD TO CONFIGURE A STORE FOR PRODUCT PROMOTION, filed concurrently with the instant application, the contents of which is herein incorporated by reference.

CPU 5160 then sets COUNT equal to zero. (step 85).

CPU 5160 then turns on green light 350. (step 86).

Figure 10A:
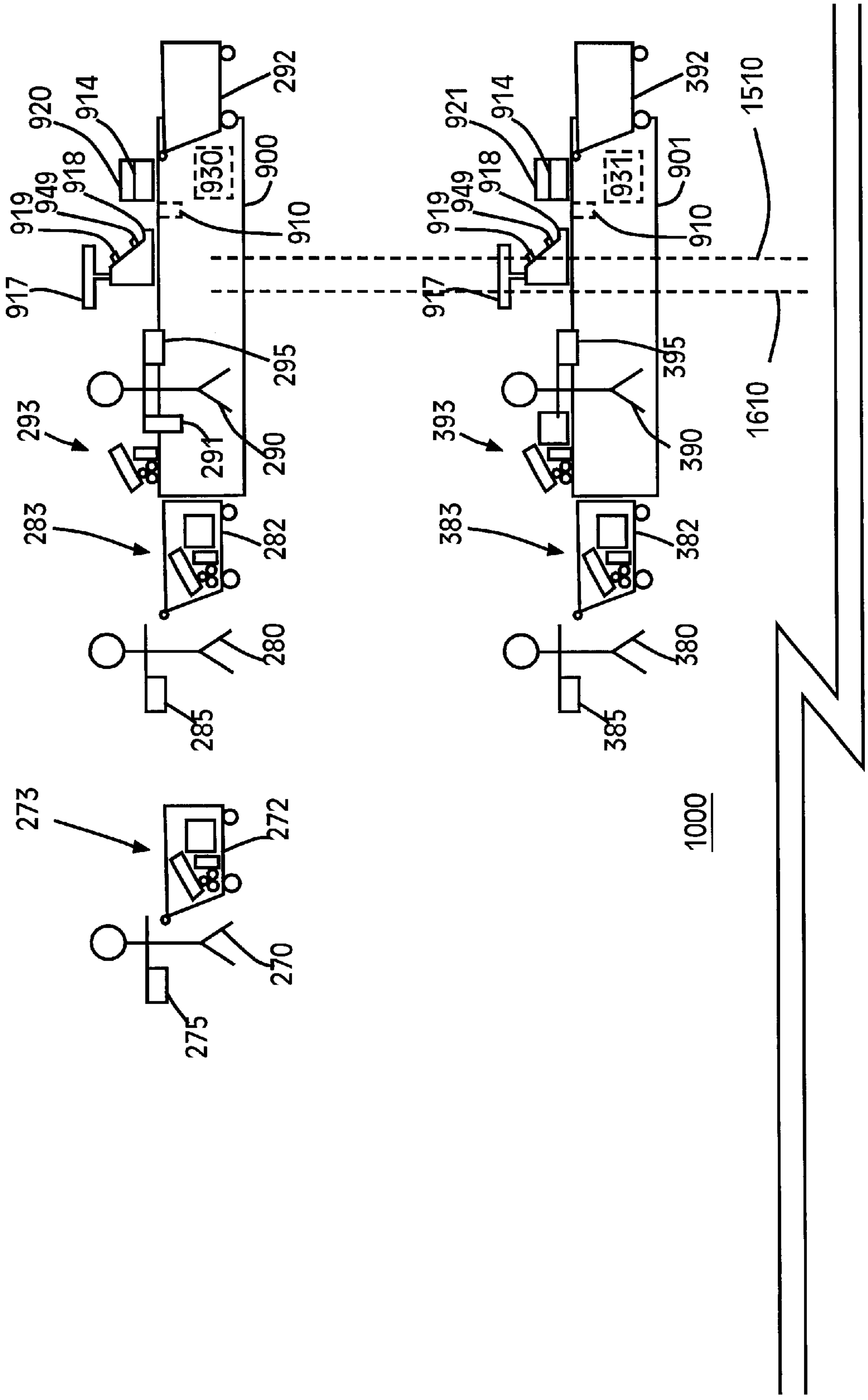
FIGS. 10A and 10B are the other type of view of another part of the retail store.
Figure 10B:
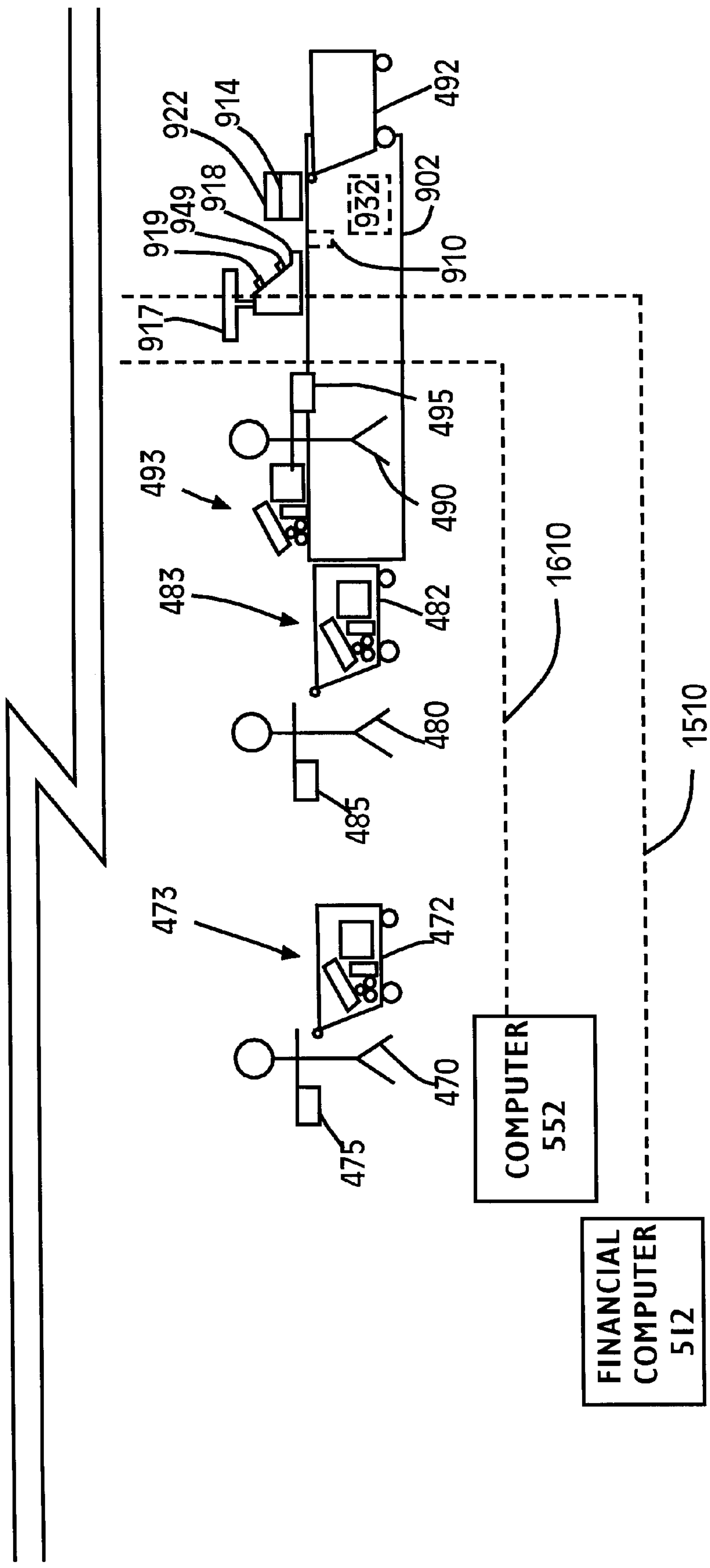

FIGS. 10A and 10B show another part of store 1000, including checkout stations 900, 901, and 902. Each checkout station includes a UPC bar code reader that detects an optical (electromagnetic) signal reflected from a UPC symbol. Checkout station 900 includes card interface system 920 having a card interface slot 914, checkout station 901 includes card interface system 921 having a card interface slot 914, and checkout station 902 includes card interface system 922 having a card interface slot 914.

Figure 11:
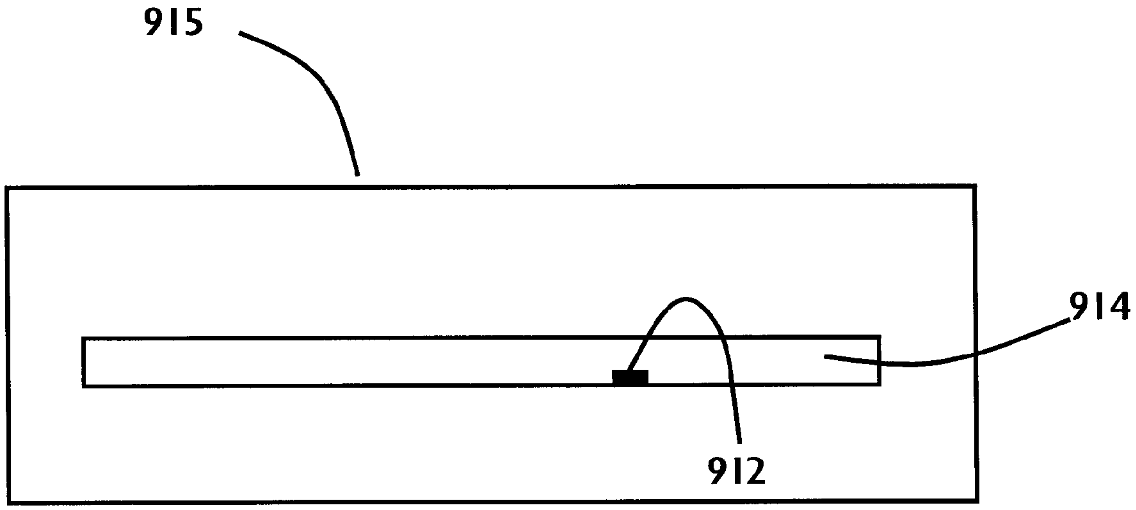
FIG. 11 is a drawing of a card interface shown in FIG. 10A.

FIG. 11 shows card reader/writer 915 including interface slot 914 having a width sufficient to accommodate the width of one of the customer cards. When a customer card is in interface slot 914, conductive contact 912 inside interface slot 914 touches contact 2427 (shown in FIG. 5C) on a customer card. Interface slot 914 has other contacts (not shown) for touching the other card contacts 2420 (shown in FIG. 5C), thereby applying power and a clock from the interface to the card.

Before shopping in the store, each of these customers obtained a customer card. For example, customer 230 obtained customer card 235 from a bank, by completing an application. The application contained questions to collect demographic data, including birth date, income level, past buying patterns, geographic location, size of family, level of education, and job-related data. The bank subsequently wrote customer identification data for customer 230 onto customer card 235, and issued customer card 235 to customer 230, and sent the customer's demographic data to headquarters site 13100 (see FIG. 25) which then stored the demographic data on a magnetic disk in center 13100. Each of customers 210, 220, 240, 250, 270, 280, and 290 obtained a respective customer card in a similar manner.

While shopping in store 1000, each of customers 210, 220, 230, 240, 250, 270, 280, and 290 carries his or her respective customer card. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows cart 292. Each customer removes one or more desired products from a shelf and places the removed product into her cart.

Upon completion of shopping, each customer brings selected products from the shelves to checkout station 900, 901, or 902.

Each customer redeems the electronic coupons by presenting her customer card, allowing the store clerk to insert the presented card into smart card reader/writer 915. For example, referring to FIGS. 4A, 4B, 10A, and 10B, a customer such as customer 290 completes the purchase of her selected products 293 by transferring products 293 from her cart 292 to station 300, and by presenting card 295 for insertion into card interface slot 314; customer 270 completes the purchase of her selected products 273 by transferring products 273 from her cart 272 to station 300, and by presenting card 275; customer 280 completes the purchase of her selected products 283 by transferring products 283 from her cart 282 to station 300, and by presenting card 285; customer 390 completes the purchase of her selected products 393 by transferring products 393 from her cart 392 to station 301, and by presenting card 395; customer 380 completes the purchase of his selected products 383 by transferring products 383 from his cart 382 to station 301, and by presenting card 385; customer 490 completes the purchase of his selected products 493 by transferring products 493 from his cart 492 to station 302, and by presenting card 495; customer 480 completes the purchase of his selected products 483 by transferring products 483 from his cart 482 to station 302, and by presenting card 485; customer 470 completes the purchase of his selected products 473 by transferring products 473 from his cart 472 to station 302, and by presenting card 475. Customer 210 completes the purchase of her selected products 214 by transferring products 214 from her cart 212 to station 300, and by presenting card 215 for insertion into card interface slot 314. It is presently preferred that card insertion occur at the beginning of the checkout transaction, although card insertion could happen later. Card interface system 920 reads the coupon offers and corresponding shelf unit COUNTs from the card.

A checkout clerk (not shown) scans each selected product past bar code reader 910, or enters the product selection information manually via keyboard 918. The clerk also scans paper coupons past bar code reader 910, or manually reads the paper coupons and enters the coupon information manually via keyboard 918. The CPU and program in system 930 processes the paper coupon information in the context of the selected products to determine discount eligibility.

A CPU and program in system 920 perform electronic coupon redemption, by processing the selected products in the context of the coupon information from the customer's card to determine discount eligibility.

At the conclusion of the transaction, the shelf unit coupon cells on the card are erased and the clerk is notified to remove the customer's card from slot 914 and return it to the customer. Checkout station 900 determines a total amount due and prints the total amount due on display 917 and on the customer's paper receipt.

Figure 12:
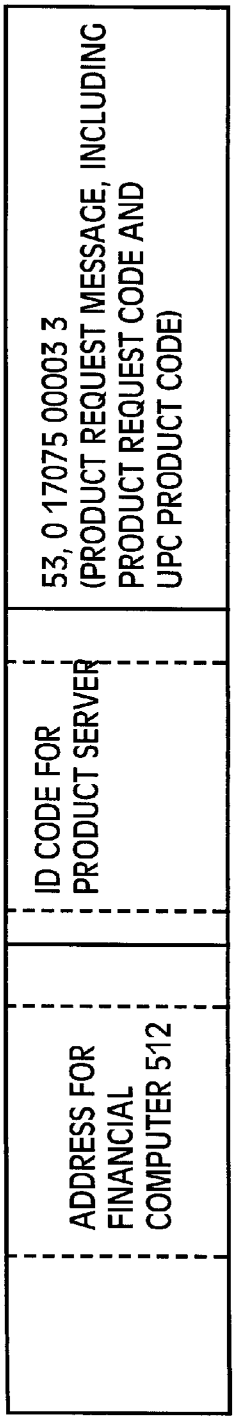
FIG. 12 is a diagram of a message sent in the second preferred system.
Figure 13:
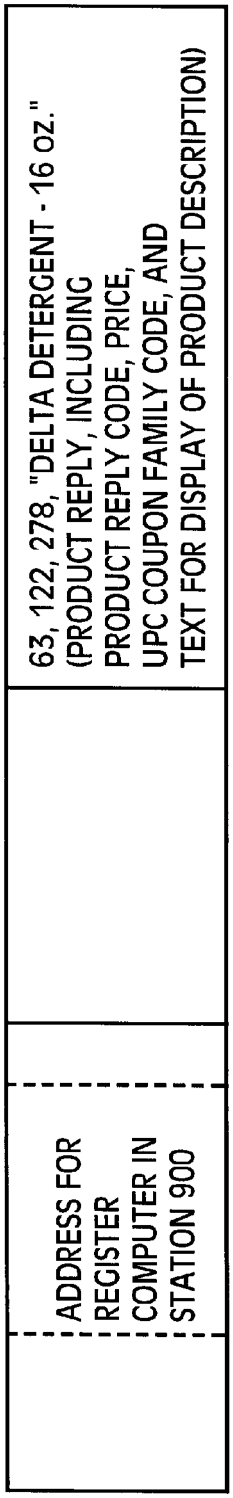
FIG. 13 is a diagram of another message sent in the second preferred system.

FIGS. 12 and 13 show messages processed by cash register system 930 in checkout station 900. FIG. 12 shows a message 3002 sent by system 930 to financial computer 512, via network cable 1510, in response to receiving a product signal from bar code reader 910. Message 3002 is a request for product information for the most recently scanned product 293.

FIG. 13 shows a message 3004 sent from financial computer 512 to system 930, via network cable 1510. Financial computer 512 sends a message 3004 in response to receiving a message 3002.

After system 930 determines a basic price for the product by processing a message 3004, system 930 displays the description of the product and product price on display 917. Thus, system 930 acts to detect a product scanned by bar code reader 910 and determine a basic price for the product by sending a message 3002 to financial computer 512 and receiving a message 3004 from financial computer 512. System 930 scans and processes each product 293 in a similar manner.

System 930 processes discount tender signals generated by card interface system 920, to deduct discounts from the basic price and determine a total amount due. System 930 displays the total amount due on display 917.

Similarly, customer 390 in FIG. 10A will complete the purchase of her selected products 393 by transferring products 393 from her cart 392 to station 901, and by presenting card 395 for insertion into interface slot 914 of station 901; and the clerk will scan each selected product 393 past UPC bar code reader 910. Customer 490 in FIG. 10B will complete the purchase of his selected products 493 by transferring products 493 from his cart 422 to station 902, and by presenting card 495 for insertion into interface slot 914 of station 902; and the clerk (not shown) will scan each selected product 493 past UPC bar code reader 910 of station 902.

The second preferred system and method will now be described in more detail.

Figure 14:
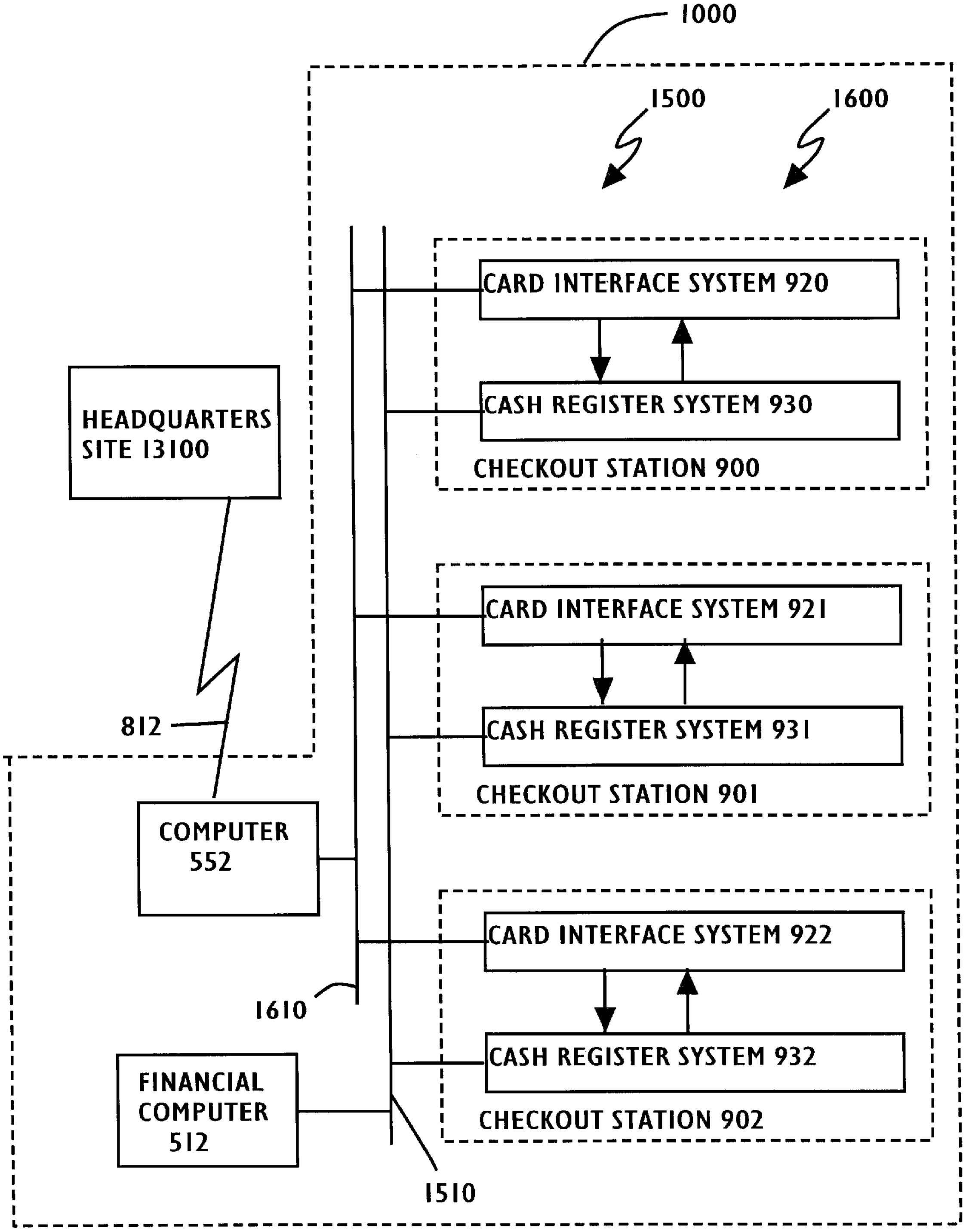
FIG. 14 is a block diagram of the first preferred computer system.

FIG. 14 shows another aspect of the first preferred system. Local Area Network (LAN) 1500 in store 1000 includes ethernet cable 1510 and 4 computers: financial computer 512, cash register system 930, cash register computer 931, and cash register computer 932. Cash register system 930 is in checkout station 900, cash register computer 931 is in checkout station 901, and cash register computer 932 is in checkout station 902. Each of computers 512, 930, 931, and 932 has a respective network address uniquely identifying the computer in network 1500. Each of computers 512, 930, 931, and 932 has a respective network interface card for recognizing when a packet containing the computer's address is sent over cable 1510, temporarily storing such a packet, and alerting the computer's CPU when such a packet is recognized.

Local Area Network (LAN) 1600 in store 1000 includes ethernet cable 1610 and 4 computers: computer 552, card interface system 920, card interface system 921, and card interface system 922. Card interface system 920 is in checkout station 900, card interface 921 is in checkout station 901, and card interface system 922 is in checkout station 902. Each of computers 552, 920, 921, and 922 has a respective network address uniquely identifying the computer in network 1600. Each of computers 552, 920, 921, and 922 has a respective network interface card for recognizing when a packet containing the computer's address is sent over cable 1610, temporarily storing such a packet, and alerting the computer's CPU when such a packet is recognized.

Figure 20:
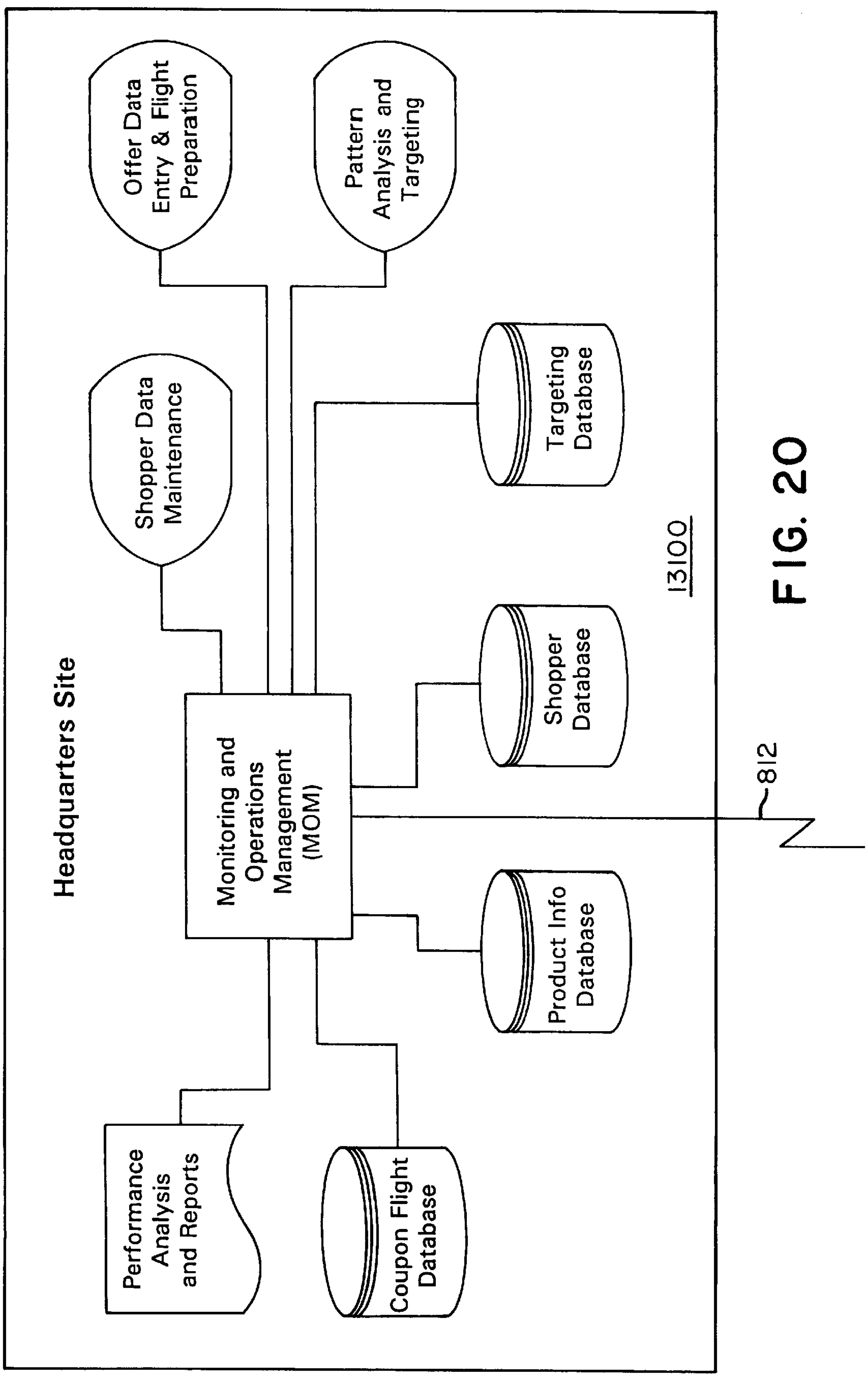
FIG. 20 is a block diagram of a headquarters site.

Computer 552 sends shelf unit dispensed count data to headquarters site 13100, shown in FIG. 20, via a modem and telephone signal path 812. Headquarters site 13100 is located outside of store 1000.

Figure 15:
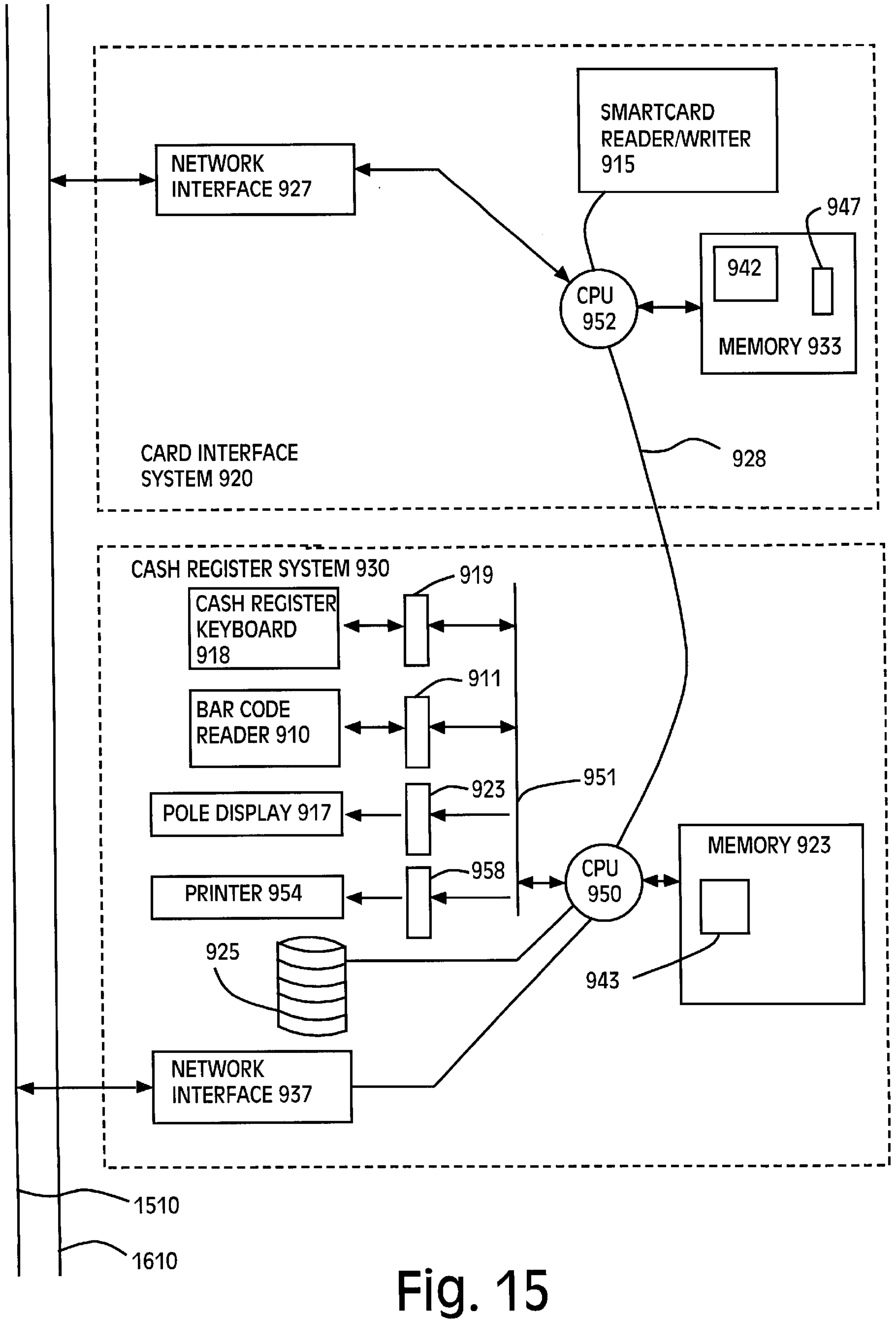
FIG. 15 is a block diagram of a check-out station shown in FIG. 10A.

FIG. 15 is a block diagram of checkout station 900 including cash register system 930 and card interface system 920. Cash register system 930 includes an IBM 4680-4690 Point of Sale (POS) System. Cash register keyboard 918 allows manual entry of alpha-numeric-data. Disk 925 provides long term storage. Bar code reader 910 generates a bar code signal, and sends the bar code signal to CPU 950 via bus 951. Poll display 917 displays product data in response to signals from CPU 950. CPU 950 executes program 943 in random access, addressable memory 323.

If bar code reader 910 sends a bar code for a product to CPU 950, CPU 950 sends a message 3002 to financial computer 512 via network interface 937, and CPU 950 sends the product UPC code to CPU 952 in system 920 via RS232 line 928. More detail about communication between cash register systems and card interface systems is disclosed in copending U.S. patent application of KEN R. POWELL, KEVIN W. HARTLEY, ELEANOR B. MAXWELL, and COREY C. SNOOK for COMPUTER SYSTEM CONFIGURATION AND METHOD FOR A STORE, filed concurrently with the instant application, the contents of which is herein incorporated by reference.

In card interface system 920, CPU 952 executes program 942 in memory 933. CPU 952 and program 942 act to receive electronic coupons from a customer card, via reader/writer 315. Memory 933 stores redemption control table 947, which enables CPU 952 to determine if a product has a corresponding electronic coupon offer.

Checkout stations 901 and 902 each have the same capabilities and hardware as checkout station 900.

FIG. 16 is a simplified diagram of redemption table 947. Each row in FIG. 16 represents an entry in redemption table 947, and each of the 5 columns shown represents an entry field.

The first field is a coupon ID stored as 4 hexadecimal digits. The second field is a UPC product code corresponding to the coupon ID. The second field is stored as binary coded decimal. The third field in FIG. 16 is a reward type. A reward type of 2 represents a percent off coupon, and a reward type of 0 represents a cents off coupon.

The fourth field in FIG. 16 is the reward quantity.

The first entry shows a reward quantity of 20 percent because the reward type field is 2. The second entry shows a reward quantity of 75 cents off because the reward type is 0. The third entry shows a reward of 50 cents off because the reward type is 0.

The fifth field shown in FIG. 16 is the DISPENSED_COUNT field, stored as 4 hexadecimal digits. The DISPENSED_COUNT field, of a particular entry, is a count of the number of the entry's coupon dispensed in the store. For example, the second entry shows 1389 coupons dispensed for coupon number 54.

CPU 952 extracts and processes the DISPENSED_COUNTs passed from the shelf units via the customer cards. These counts are passed as 2-byte values for each unique shelf unit coupon offer dispensed to the customer card (for each shelf unit represented on the customer card). CPU 952 saves the 2-byte values in redemption control table 947 for pickup by headquarters site 13100, via computer 552.

Checkout stations 901 and 902 each have the same capabilities and hardware as checkout station 900, cash register systems 931 and 932 each have the same capabilities and hardware as cash register system 930, and card interface systems 921 and 922 each have the same capabilities and hardware as card interface system 920.

Figures 17, 18:
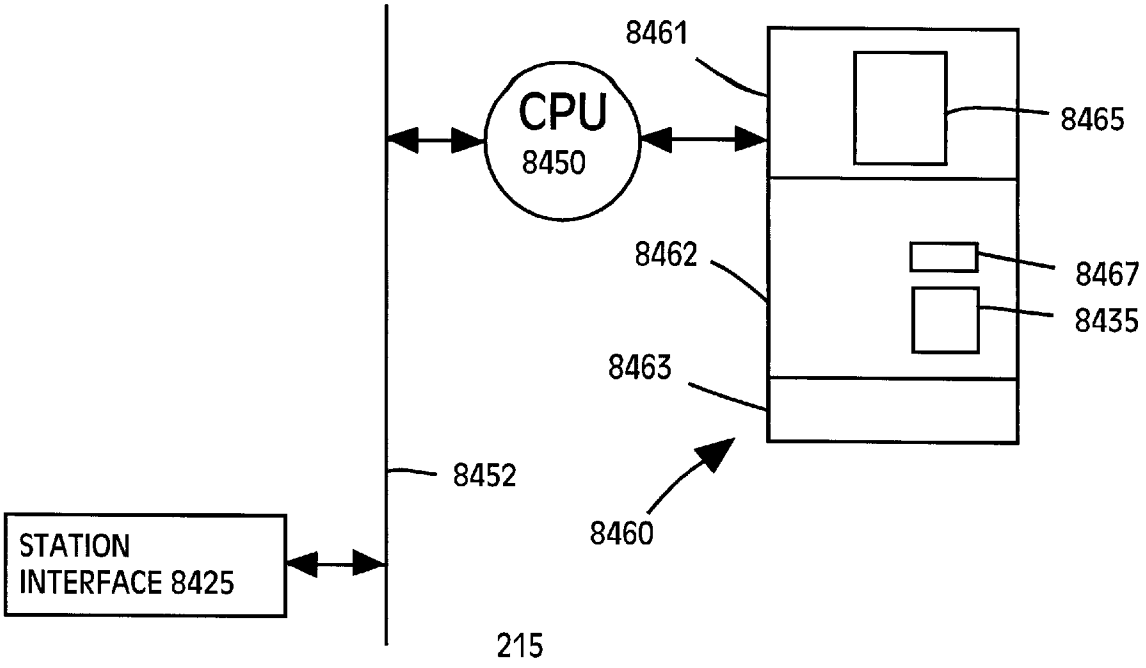
FIG. 17 is a block diagram of a customer card.
FIG. 18 is a diagram of some memory contents of a customer card.

FIG. 17 is a block diagram of customer card 215, including CPU 8450, and memory 8460. Random access memory 8460 includes three addressable segments: nonvolatile read only memory (ROM) 8461; nonvolatile, electrically erasable memory (EEPROM) 8462; and memory 8463 for temporary storage. Station interface 8425 includes a serial to parallel converter for transferring data signals between contact 2427 (FIG. 6C) and CPU 8450 over parallel bus 8452. ROM 8461 stores a program 8465 executed by CPU 8450.

Each of customer cards 225, 235, 255, 245, 275, 285, 295, 385, 395, 475, 485, and 495 have the same hardware structure as customer card 215.

EEPROM 8462 stores customer card identification data 8467. Customer card identification data 8467 is a 6 byte field that uniquely identifies the card. For example, identification data 8467 in customer card 235 uniquely identifies the card held by customer 230.

EEPROM 8462 also stores coupons (product pricing data) received from one or more coupon dispensing devices. This product data includes a list of product discounts 8435. When a customer inserts a customer card into a coupon dispensing device, CPU 8450 receives a coupon code for the product from the device and adds the code to the list.

FIG. 18 shows coupon table 8435, which is in a data structure within other data structures in EEPROM 8462 of customer card 215. Each row in FIG. 18 represents a coupon cell, an entry in table 8435, and each of the two columns represents a field within each cell, within each entry. The first field represented by the left column, is a 4 hexadecimal digit coupon number. Table 8435 has three entries, reflecting the fact that customer 210 has received three electronic coupons from shelf units in store 1000. The entry having the coupon number 1317 corresponds to a coupon for purchase of a box of Old World Pasta 124. The entry having the coupon number 0054 corresponds to a coupon for purchase of a box of Lighthouse Light Bulbs 134. The entry having the number 3656 corresponds to a coupon for purchase of detergent bottles 112.

The second field in table 8435, represented by the right column shown in FIG. 18, is a dispensed count received from a dispensing unit.

CPU 952 communicates with a card in interface slot 914 through smart card reader/writer 915. A switch (not shown) in interface slot 914 alerts reader/writer 915, which alerts CPU 952, that a card has been inserted into the slot. Subsequently, CPU 952 causes smart card reader/writer 915 to reset the card. The card then answers the reset by sending an "answer to reset" data block in accordance with the ISO standard ISO 7816-3: 1989 (E). CPU 952 then reads a customer card ID record, the reader/writer 915. CPU 952 then reads a pointer record and, using the pointer record, reads coupon cell table 8435 in EEPROM 8462 of the customer card, and temporarily stores table 8435 contents in memory 933.

When CPU 952 receives a product UPC code from CPU 950, CPU 952 searches the UPC product code field of redemption control table 947, to determine whether the product has a matching entry in table 947. If the product does have a matching entry in table 947, CPU 952 searches table 8435 to confirm that the customer has the coupon of her card. If the customer has the coupon on her card and the qualifier conditions are satisfied, CPU 952 sends discount information to CPU 950 via RS232 line 928, causing CPU 950 to adjust the total amount due.

Methods of detecting selected products, and sending discount information to a Point of Sale system, is a subject of copending application of KEN R. POWELL, KEVIN W. HARTLEY, ELEANOR B. MAXWELL, and COREY C. SNOOK for COMPUTER SYSTEM CONFIGURATION AND METHOD FOR A STORE, filed concurrently with the instant application, the contents of which is herein incorporated by reference. Of course variations on the second embodiment of the invention may be practiced with a single CPU having electronic coupon processing integrated with conventional UPC product scanning and price lookup.

CPU 952 uses the shelf unit COUNT, received via the DISPENSED_COUNT field of a coupon cell from a customer's card, to conditionally update the dispensed count information of the current flight redemption data, by conditionally setting the DISPENSED_COUNT field in the matching entry of redemption table 947. More specifically, CPU 952 executes the instruction:

IF TABLE_8435 [CARD_INDEX, DISPENSED_COUNT]>
TABLE_947 [I, DISPENSED_COUNT]
THEN
TABLE_947 [I, DISPENSED_COUNT]=TABLE_8435 [CARD_INDEX, DISPENSED_COUNT], wherein I is the index in table 947 of the coupon that matches the product code received from CPU 950, and TABLE_8435 is an array that holds table 8435 received from the customer card. In other words if the shelf unit dispensed count from the customer card is less than the current dispensed count in redemption table 947, then ignore it (assume it is an old count). Otherwise, replace the DISPENSED_COUNT in redemption table 947 with the shelf unit DISPENSED_COUNT from the customer card (assume the count increased).

In other words, if TABLE_947 [I, DISPENSED_COUNT] is considered to be a type of stored signal, and TABLE_8435 [CARD_INDEX, DISPENSED_COUNT] is considered to be a first signal, CPU 952 reads the first signal from a card and conditionally maintains the stored signal depending on a content of the first signal.

An advantage of this conditional updating, based on a content of the data, is that the coupon cells need not include a lengthy time stamp.

In summary, the shelf units of the second preferred system accumulate statistical data as customers use their cards to receive electronic coupons. When a particular customer presents her card to the shelf unit, the shelf unit writes an electronic coupon onto her card. The shelf unit also writes dispensed count data, accumulated over previous days, onto her card. Subsequently, when the customer uses her card at a checkout station, the station reads the dispensed count data. Thus, the second preferred system uses customer cards to audit the shelf units. In other words, when the shelf unit writes a coupon onto the customer card of an additional customer, the shelf unit also writes data corresponding to transactions made by a plurality of other customers.

In other words, shelf unit 115 acts to perform a transaction with a plurality of customers. For example, shelf unit 115 may dispense electronic coupons to customers 230, 240, 270. Subsequently, shelf unit performs a transaction with customer 210, by communicating with card 215 of customer 210. More specifically, shelf unit 115 writes an item onto card 215. The item a coupon cell, which is an entry in coupon table 8435. The entry is a type of signal. The second field of the coupon cell is a dispensed count for shelf unit 115. This dispensed count reflects the number of electronic coupons dispensed to previous customers. Thus, this dispensed count is essentially a condition of shelf unit 115, resulting from previous transactions with a plurality of other customers.

Subsequently, card interface system 920 reads the dispensed counts from table 8435 from card 215 and conditionally writes each read dispensed count into the dispensed count field of the corresponding entry in table 947.

Figure 19:
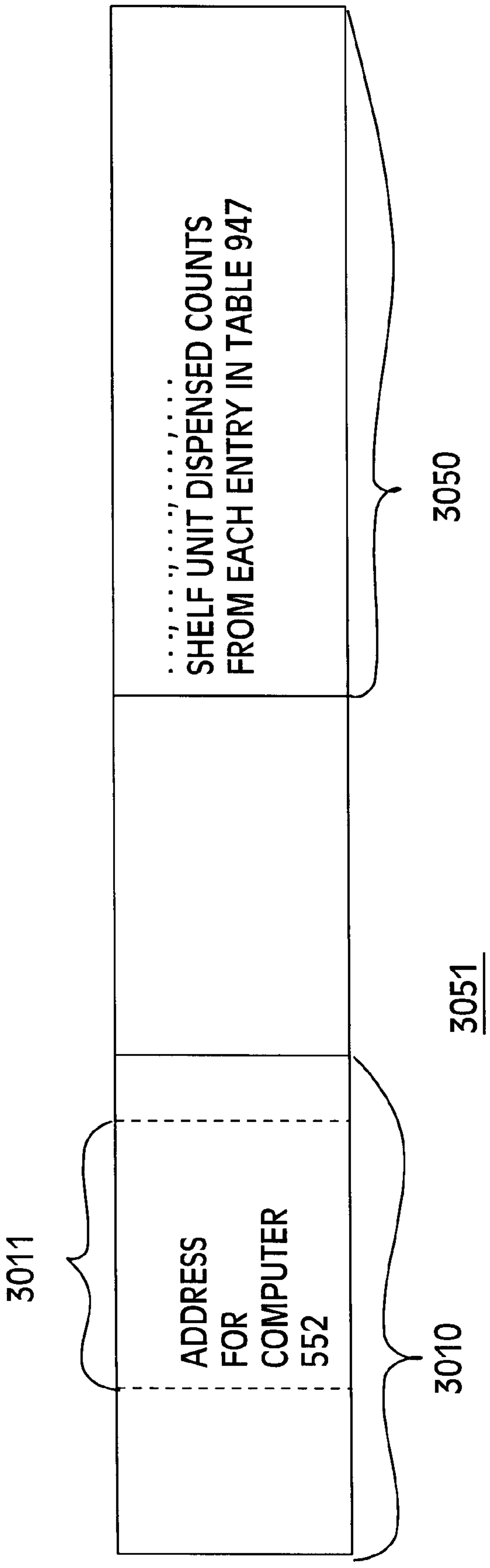
FIG. 19 is a message sending shelf unit dispensed count data from system 920 from computer 552.

FIG. 19 shows a message 3051 sent by system 920, via network cable 1610, to computer 552. Message 3051 includes the dispensed counts from each entry in redemption table 947. Subsequently, computer 552 sends the dispensed counts, from message 3051, to headquarters site 13100 via telephone signal path 812, which is a type of wide area communication link.

System 920 may be considered spatially removed from the shelf units.

Subsequently, headquarters site 13100 receives the dispensed counts from computer 552. Responsive to the received dispensed counts, headquarters site 13100 prints a report on paper 517 shown in FIG. 21. To print the report of FIG. 21, headquarter site 13100 uses the dispensed count most recently received from computer 552, to generate the information in the DISPENSED COUNT column. Headquarter site 13100 uses the most recently received information, in combination with older information stored in headquarter site 13100, to generate the information shown in the DISPENSED RATE column shown on the report on paper 517. The last two lines on paper 517, indicating a malfunction of the dispenser for a coupon 8273, are essentially a display of a signal indicating that a machine needs service.

Third Preferred Embodiment

Figure 22:
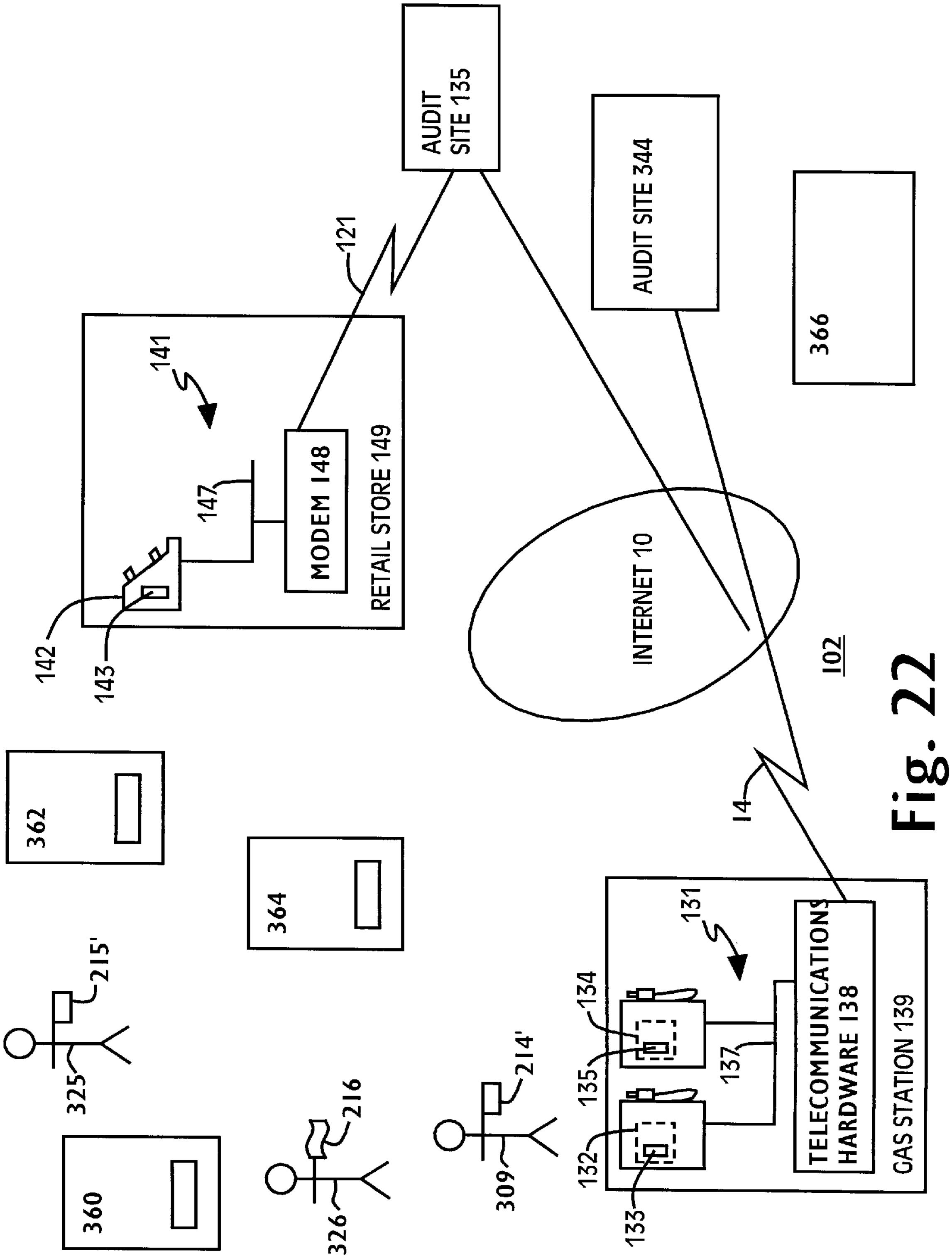
FIG. 22 is a diagram of a system in accordance with the third preferred embodiment of the present invention.

FIG. 22 shows system 102 according to a third preferred embodiment of the present invention. Vending machine 360, vending machine 362, vending machine 364, and paper cash dispensing machine 366 are each isolated without wide area signal paths to other systems. Machines 360, 362, 364, and 366 each includes circuitry for communicating with a customer card.

Customer 309 carries a portable card 214' for enabling transactions in system 102. Customer 325 carries a portable card 215' for enabling transactions in system 102. Customer 326 carries paper currency 216 for enabling transactions in system 102.

System 102 also includes audit site 135 and audit site 344.

Gas station computer system 131 is in gas station 139. Computer system 131 includes gas pump point of scale (POS) terminal 132 with card interface slot 133, gas pump POS terminal 134 with card interface slot 135, telecommunications circuitry 138, and network cable 137 coupling POS terminal 132, POS terminal 134 and telecommunications circuitry 138 together. POS terminals 132 and 134 are each spatially removed from machines 360, 362, 364, and 366.

Telecommunications hardware 138 is coupled to audit site 40 via the Internet 10 and wide area communications link 14. Communications hardware 138 may include a modem, PSTN interface circuitry, or Ti connection interface circuitry, for example. Telecommunication hardware 138 could also be a wireless transceiver for satellite communication, for example.

Thus, computer system 131 is connected to other systems via a wide area signal path. System 131 has circuitry, such as POS terminal 132, for communicating with a customer card.

Retail store checkout system 141 includes retail point of sale (POS) terminal 142 with card interface slot 143, modem 148, and cable 147 coupling POS terminal 142 to modem 148. Modem 148 can be coupled to audit site 135 via telephone link 121. System 141 is in retail store 149. Thus, checkout system 141 is coupled to another system via wide area telephone link 121. POS terminal 142 includes circuitry that communicates with customer cards.

Figure 23:
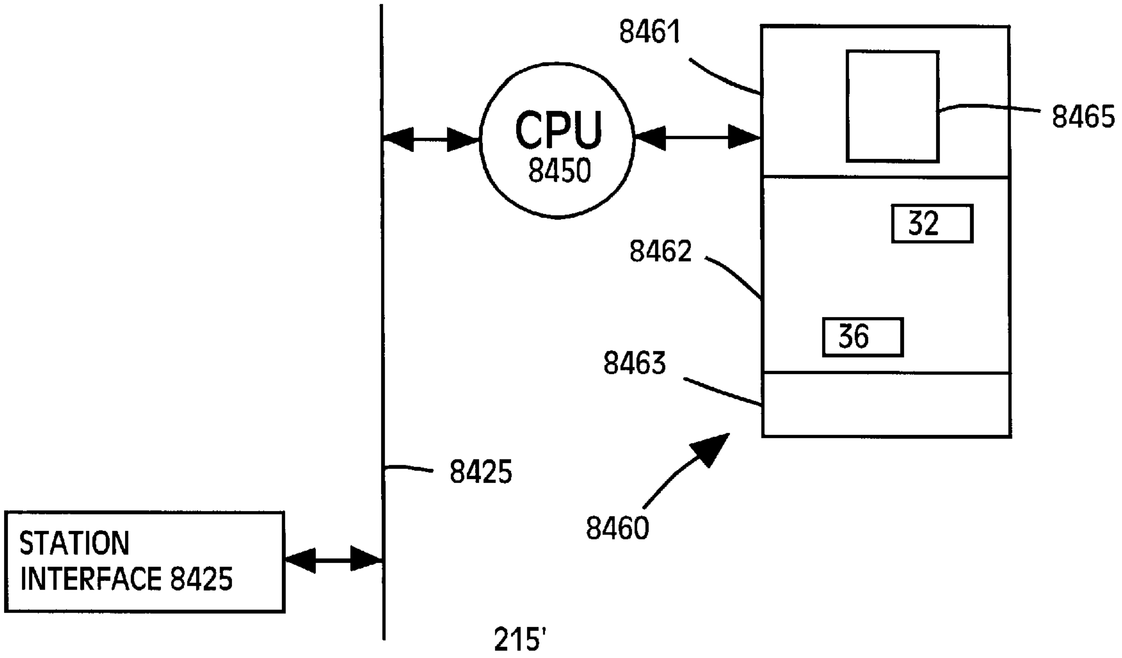
FIG. 23 is a block diagram of a customer card 215' in accordance with the third preferred system.

FIG. 23 is a block diagram of customer card 215', including stored electronic currency 32, which may be debited by a transaction machine, such as gas station POS terminal 134, vending machine 362, or retail store POS terminal 142. Memory 8462 also includes a transaction machine condition record 36, previously written by a transaction machine conducting a transaction with card 215'.

Figure 24:
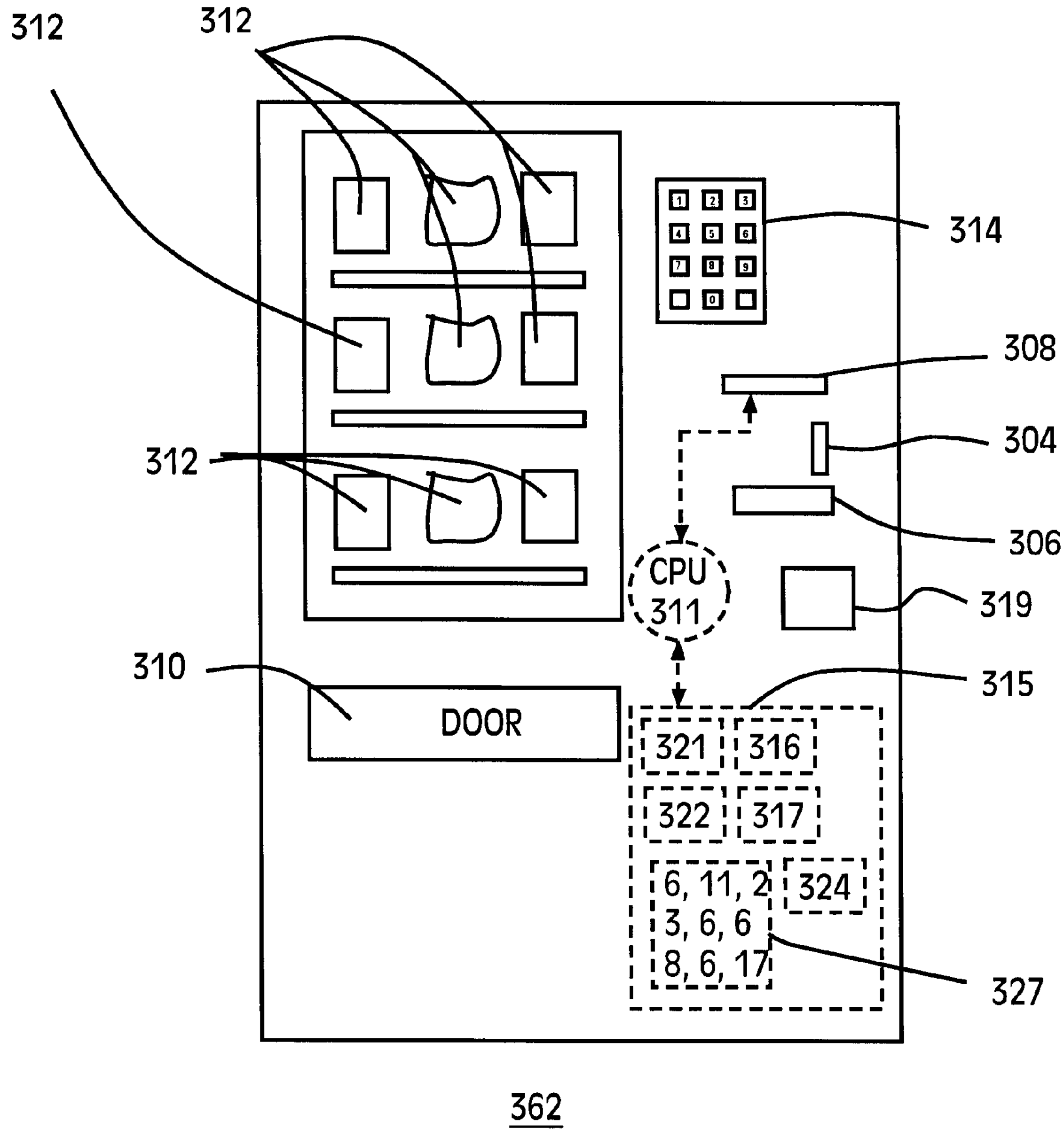
FIG. 24 is a view of a vending machine in the third preferred system in more detail.

FIG. 24 shows vending machine 362 in more detail. Vending machine 362 dispenses food items 312 in exchange for coin or paper currency, or for stored value from a customer card, or for creditor's rights obtained by communication with a credit card. When a customer wishes to purchase a package of food 312 from vending machine 362, she may insert paper currency into paper currency slot 306, coins into coin currency slot 304, or a card into card slot 308. She then selects one of the food packages 312 using keypad 314. In response, vending machine 362 dispenses the selected food package 312 via door 310.

Vending machine 362 includes CPU 311 and memory 315 storing machine ID 321. CPU 311 reads from and writes to card interface slot 308, and updates data items in memory 315. Data items in memory 315 include current time and date 322. Data items in memory 315 also include statistical data such as product dispensed counts 327, paper currency receipt data 316, coin currency receipt data 317, and coin currency return data 324. Product dispensed counts 327 is an array of rows and columns having respective dispensed count values corresponding to the rows and columns of food packages in machine 362. Paper currency receipt data 316 includes respective counts for each of the number of $1 bills, $5 bills, $10 bills, and $20 bills received via currency receipt slot 306. Coin currency receipt data 317 includes respective counts for each of the number of quarters, dimes, and nickels received via coin slot 304. Coin currency return data 324 includes respective counts for each of the number of quarters, dimes, and nickels returned to customers as change via coin return port 319.

Figure 25:
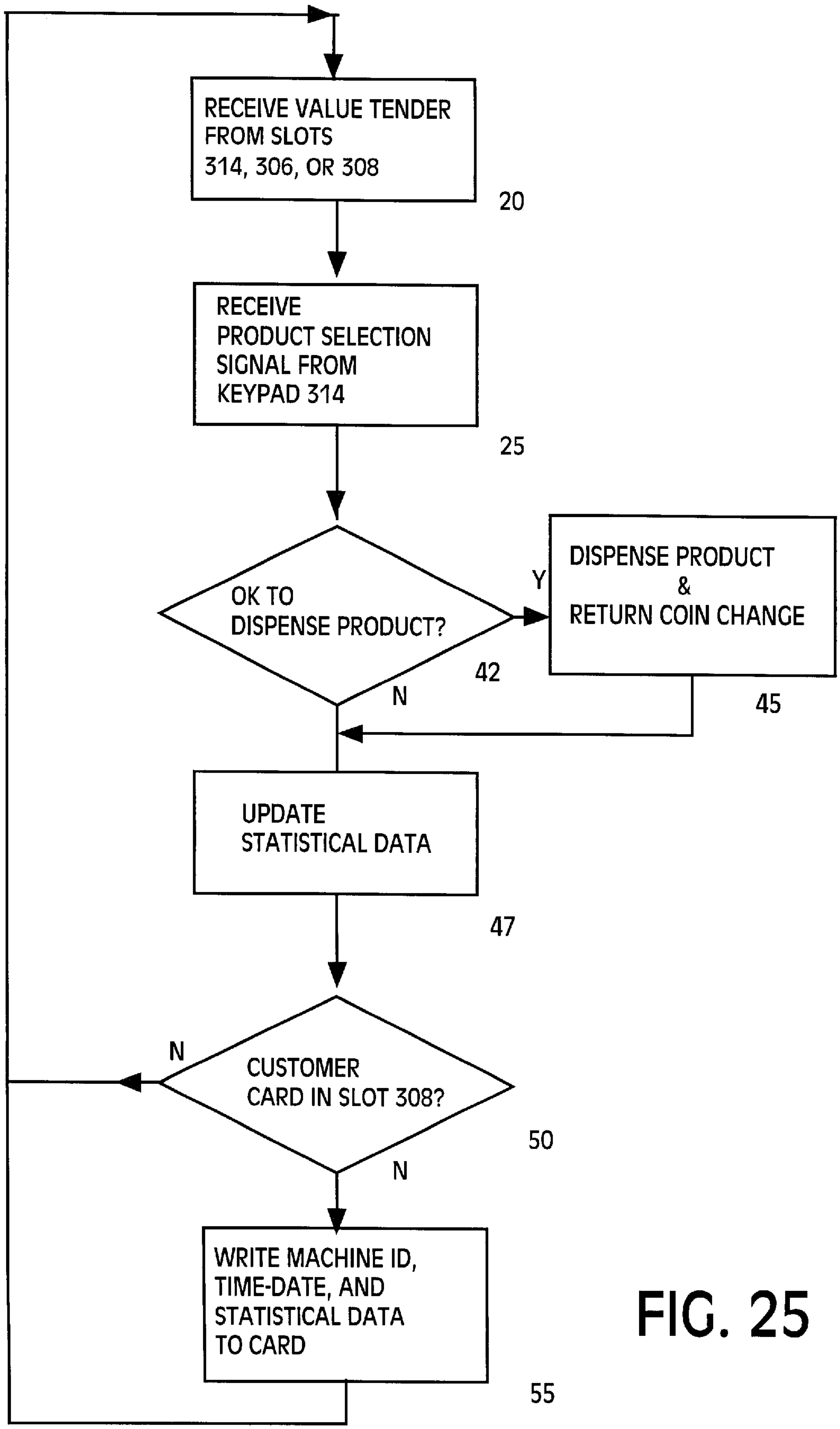
FIG. 25 is a flow chart of a process performed by the vending machine shown in FIG. 29.

FIG. 25 is a flow chart of a process performed by CPU 311 executing a program stored in memory 315. To begin a transaction, CPU 311 receives value tender from coin slot 304, currency slot 306, or card slot 308. (step 20). The customer selects a product using keypad 314, and CPU 311 receives the resulting product selection signal from keypad 314. (step 25). CPU 311 determines whether the selected product can be dispensed to the customer. The selected product can be dispensed to the customer if the product is present in machine 362, meaning that previous transactions have not exhausted the supply of the product, and sufficient value was tendered for the product price. (step 42). If the product is to be dispensed, CPU 311 completes the transaction by causing machine 362 to dispense the product and return any change, if tangible currency was tendered; or to deduct electronic currency from a stored value card if the customer is using such a card for the transaction. (step 45). CPU 311 updates the statistical data by incrementing a product dispensed count in array 327, corresponding to any product dispensed to the customer. CPU 311 also updates currency receipt data 316 or 317 to reflect any currency received from the customer, and updates currency return data 324 to reflect any coins returned to the customer as change. (step 47).

Figure 26:
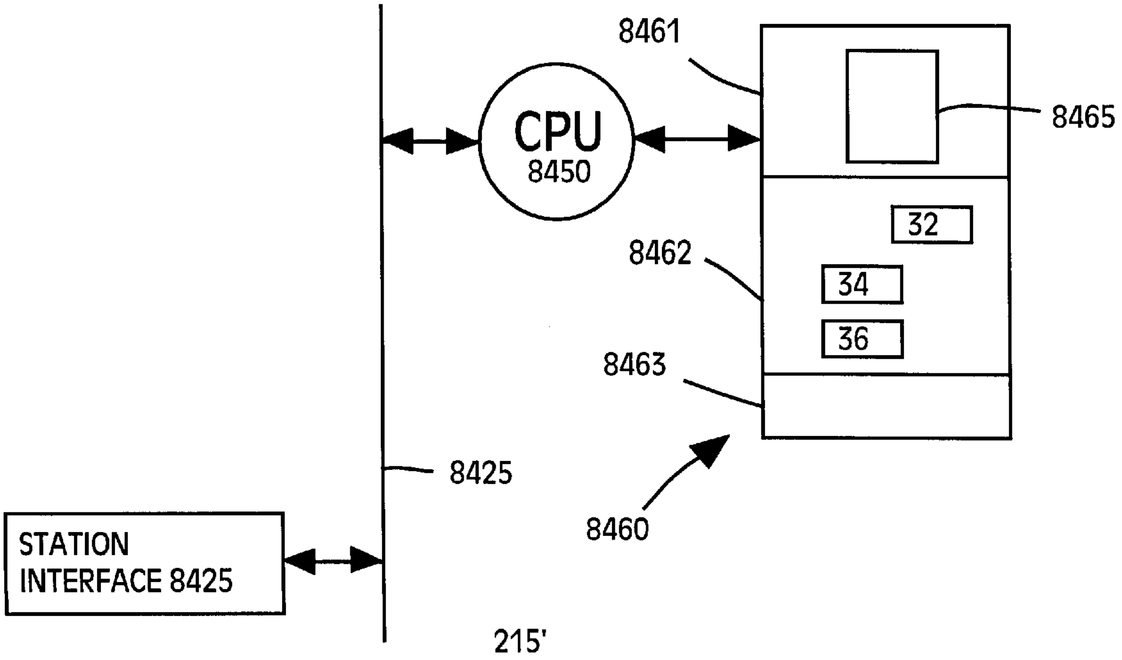
FIG. 26 is a block diagram of the customer card 215' after the owner of the card has performed a transaction with the vending machine of FIG. 29.

If slot 308 contains a type of customer card that can store condition data (step 50), processor 311 writes a condition record 34 onto the customer card (step 55), as shown in FIG. 26. FIG. 26 shows card 215' after vending machine 362 has performed the process of FIG. 30 with a customer using card 215'. Condition record 34 includes the IP address of a computer to receive audit data about vending machine 362, the TCP port number associated with process on the computer to receive the audit data, and the audit data itself, which includes data about currency receipts and food package inventory.

FIG. 27 shows condition record 34, written by vending machine 362, in more detail. Each of the three columns in FIG. 27 represents a field in condition record 34. The first column, representing the first field in record 34, is destination data including the IP Internet address for a computer in audit site 135, and the TCP port number associated with an application running in the computer in audit site 135.

The second column, representing the second field, is the time and place where condition data was collected. The second field includes time-date information 322 and machine ID 321.

The third column, representing the third field in record 34, includes dispensed counts 327 for each row in vending machine 362, thereby providing an indication when machine 362 needs to be replenished with additional food packages 312. The third field in record 34 also includes currency receipt data 316, currency receipt data 317, and currency return data 324, thereby providing an indication when machine 362 needs to have its currency bins emptied.

Subsequently, when the customer carrying card 215' uses her card at gas pump POS terminal 132, for example, system 131 reads record 34 from her card 215', as well as performing a gas dispensing transaction with her. System 131 also erases record 34 from card 215'; system 131 deallocates the memory space used to store record 34 on card 215'.

System 131 uses the IP destination address and a TCP destination port number in record 34 to construct a TCP/IP packet for sending over Internet 10. In this example, the destination of the packet is a server in audit site 135. Thus, the processor sends audit data from record 34 to one of a plurality of audit sites in accordance with a destination identifier (IP address) stored on the card.

When the customer uses her card at gas pump POS terminal 132, system 131 also reads record 36 from the customer's card. System 131 also erases record 36 from card 215'; system 131 deallocates the memory space used to store record 36 on card 215'.

System 131 uses an IP destination address and TCP destination port number, stored in record 36, to construct a TCP/IP packet for sending over Internet 10. In this example, the destination of the packet containing audit data from record 36 is a destination other then audit site 135.

Although in the third preferred embodiment the vending machine audit data is directed using an IP address, many alternate variations are possible, including a Universal Resource Locator (URL), which a Domain Name Server may translate to an IP address; a telephone number; a custom code; or no code, in which case the data could always be directed to a fixed destination.

In other words, vending machine 362 may perform a transaction with customer 326 by receiving paper currency 216 and dispensing a food package to customer 326, and may perform a transaction with customer 309 by receiving electronic currency from card 214' and dispensing a food package to customer 309. Subsequently, vending machine 362 acts to begin a transaction with customer 325 and communicate with card 215'. Vending machine 362 may complete the transaction with customer 325 by deducting electronic currency from card 215' and sending a food package (an article of tangible merchandise) to customer 325. Vending machine 362 writes record 34, which is a type of signal, onto card 215'. Record 34 corresponds to a condition of vending machine 362. The statistical data in record 34 results from previous transactions for a plurality of other customers.

Subsequently, customer 325 begins a transaction at POS terminal 132 in gas station 139, to buy gasoline, which is a type of tangible merchandise. Gas station POS terminal 132 reads record 34 from card 215' and sends record 34 over wide area communication link 14, to a processor in audit site 135.

Figure 28:
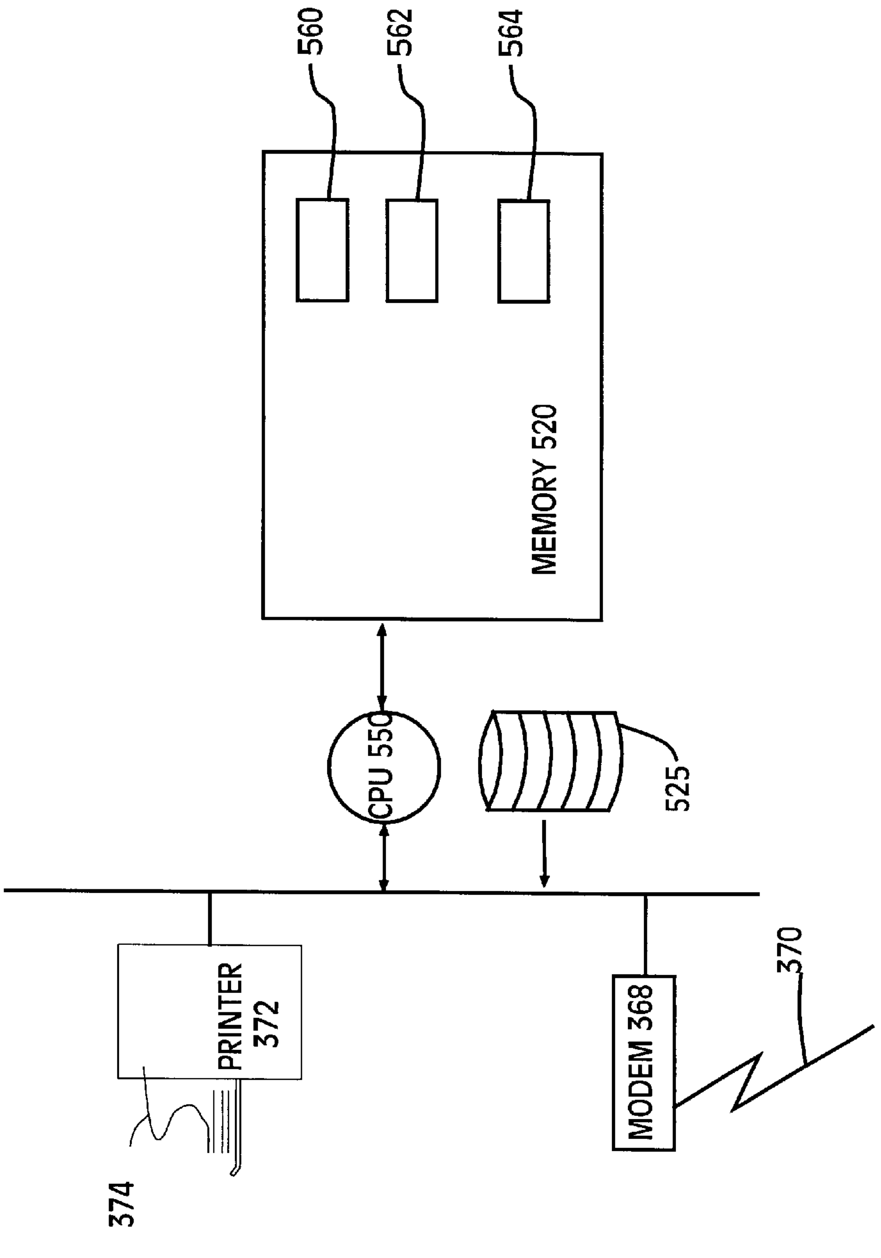
FIG. 28 is a block diagram of an audit site.

FIG. 28 shows a block diagram of audit site 135. Audit site 135 includes modem 368 for receiving vending machine statistical data from wide area communication link 370. Audit site 135 receives statistical data for multiple vending machines from a plurality of customer cards, via link 370. Memory 520 includes statistical data record 560 for machine 360, statistical data record 562 for machine 362, and statistical data record 564 for machine 364. Each of records 560, 562, and 564 includes a respective time and date field corresponding to time-date field 322 in the condition records received link 370. When CPU 550 receives a condition record via link 370, CPU 550 only updates a corresponding record in memory 520 if the time-date field and the received record has a time-date later than an existing time-date in the corresponding record in memory 520. Thus, relatively stale statistical data will not overwrite relatively fresh statistical data in memory 520. In other words, if statistical data in a record received via link 370 is considered a first signal, and the time-date field 322 in the record is considered a time signal, and record 562 is considered a stored signal, CPU 550 conditionally maintains the stored signal depending on a content of the time signal. CPU 550 refrains from overwriting the record 562 if time-date field in record 562 is equal to or later than the time-date field 322 of the received condition record.

CPU 550 further processes the received condition data to print a report on paper 374 using printer 372. FIG. 29 shows the report on paper 374, including information on the status of various vending machines, including vending machine 362.

Conclusion

Although the illustrated cards have been shown with a relatively simple, abstract, memory organization, more involved memory organizations are possible, allowing a single card to function in numerous applications. Condition data could be stored in a variety of locations on a card. Condition data could be tightly intermingled with application data, as shown by the coupon cell scheme in the second preferred embodiment, for example. Condition data could also be stored in reserved records on the card, as shown in the third preferred embodiment of the invention, for example.

Embodiments of the invention may be practiced with many types of transactions including, for example, a coupon dispensing transaction, a coupon redemption transaction, a product purchase transaction, an electronic currency replenishment transaction, or a paper cash dispensing transaction.

Writing of condition data to a card may be independent or dependent on a transaction being successful and complete. For example, in the third preferred embodiment the writing of condition data to a card is independent of whether the customer received a product. In other words, in the third preferred embodiment it is only necessary that some customer, carrying a customer card, begin a transaction. Condition data written to the card will result from transactions with previous customers. The condition data written to the card may or may not also result from a transaction with the card carrying customer.

Embodiments of the invention may be practiced without writing condition data each time a customer card is used in a transaction. For example, condition data could be written to only a certain percentage of the cards presented for transactions. Further, writing of the condition data may be dependent upon some state of a machine. For example, a vending machine might only write condition data if currency bins have received a certain amount of currency, or if inventory of a certain product is below a certain quantity. Further, writing of condition data may be triggered by a transaction being unsuccessful.

Similarly, embodiments of the invention may be practiced with a wide-area-connected system that does not necessarily read any condition data each time a card is presented for a transaction.

Although the illustrated embodiments show condition data having a plurality of digits and a plurality of fields, it is contemplated that condition data could be a single digit indicating that a machine needs service, for example.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a system including a first person, a second person, a card transported by the second person, and a first system, the method comprising the steps, performed by the first system, of:

performing a first transaction, the first transaction being for transferring title to a first item to the first person;

subsequently, beginning a second transaction and communicating a first signal with the card, the second transaction being for transferring title to a second item to the second person; and writing a second signal onto the card, the second signal corresponding to a condition of the first system, the condition resulting from the first transaction.

2. The method of claim 1 wherein the system further includes a second system, and the method further includes the steps, performed by the second system, of:

subsequently, reading second signal from the card; and sending the second signal, read in the previous step, over a wide area communication link.

3. The method of claim 1 further including sending the second item from the first system to the second person.

4. The method of claim 3 wherein the second item includes a third signal, and the sending step includes sending the third signal to the card.

5. The method of claim 3 wherein the second item includes merchandise, and the sending step includes sending the merchandise to the second person.

6. The method of claim 1 wherein the system further includes a second system, and the method further includes the steps, performed by the second system, of:

subsequently, reading the second signal from the card; and conditionally maintaining a stored signal depending on a content of the second signal.

7. The method of claim 1 wherein writing the second signal includes writing a time signal.

8. The method of claim 7 wherein the system further includes a second system, and the method further includes the steps, performed by the second system, of:

subsequently, reading the second signal and the time signal from the card; and conditionally maintaining a stored signal depending on a content of the time signal.

9. The method of claim 1 wherein the system further includes a second system, and a processor, and the method further includes the step, performed by the second system, of reading the second signal from the card, and the step of sending the second signal, read in the reading step, to the processor.

10. The method of claim 1 wherein writing includes writing a count of previous transactions.

11. The method of claim 1 wherein writing includes writing a quantity of signals dispensed in previous transactions.

12. The method of claim 1 wherein writing includes writing a quantity of merchandise dispensed in previous transactions.

13. The method of claim 1 wherein writing includes writing a quantity of tangible currency dispensed in previous transactions.

14. The method of claim 1 wherein writing includes writing an amount of payment received in previous transactions.

15. The method of claim 1 wherein writing includes writing a quantity of currency received in previous transactions.

16. The method of claim 1 wherein performing the first transaction includes sending the first item from the first system to the first person.

17. The method of claim 16 wherein the item includes a third signal, and the sending step includes sending the third signal to the card.

18. The method of claim 16 wherein the item includes merchandise, and the sending step includes sending the merchandise to the first person.

19. The method of claim 1 wherein the condition also results from the second transaction.

20. The method of claim 1 wherein communicating includes sending a reset signal to the card.

21. The method of claim 1 wherein communicating includes receiving a value tender from the card.

22. The method of claim 1 wherein the second item includes currency.

23. The method of claim 1 wherein the second item is tangible.

24. The method of claim 1 wherein the second item includes tangible currency.

25. A method for a system including a first person, a second person, a card transported by the second person, a first system, and a second system, the method comprising the steps, performed by the second system, of:

beginning a transaction for the second person by communicating a first signal with the card, the transaction being for transferring title to an item to the second person; and reading a second signal from the card, the second signal corresponding to a condition of the first system, the condition resulting from a previous transaction between the first system and the first person.

26. The method of claim 25 further including sending the second signal over a wide area communication link.

27. The method of claim 25 further including sending the item from the second system to the second person.

28. The method of claim 27 wherein the item includes merchandise, and the sending step includes sending the merchandise to the second person.

29. The method of claim 25 wherein the system further includes a stored signal, and the method further includes conditionally maintaining the stored signal depending on a content of the second signal.

30. The method of claim 25 wherein the system further includes a stored signal, and the method further includes using the second signal to conditionally maintain the stored signal depending on a content of a time signal.

31. The method of claim 25 wherein the system further includes a processor, and the method further includes the step of sending the second signal to the processor.

32. The method of claim 25 wherein reading includes reading a count of previous transactions.

33. The method of claim 25 wherein reading includes reading a quantity of signals dispensed in previous transactions.

34. The method of claim 25 wherein reading includes reading a quantity of merchandise dispensed in previous transactions.

35. The method of claim 25 wherein reading includes reading a quantity of tangible currency dispensed in previous transactions.

36. The method of claim 25 wherein reading includes reading an amount of payment received in previous transactions.

37. The method of claim 25 wherein reading includes reading a quantity of currency received in previous transactions.

38. The method claim 25 wherein the item includes currency.

39. The method of claim 25 wherein the item is tangible.

40. The method of claim 25 wherein the item includes tangible currency.

41. A system for operating with first and second persons, and a card transported by the second person, the system comprising:

logic that performs a first transaction, the first transaction being for transferring title to a first item to the first person, and subsequently begins a second transaction and communicates a first signal with the card, the second transaction being for transferring title to a second item to the second person; and a writer for writing a second signal onto the card, the second signal corresponding to a condition of the system, the condition resulting from the first transaction.

42. The system of claim 41 further including a detector that detects whether a person is using a card.

43. The system of claim 41 further including a reader that reads the second signal from the card; and a sender that sends the read second signal over a wide area communication link.

44. The system of claim 41 further including a sender that sends an item from the system to a person.

45. The system of claim 44 wherein the item includes a third signal.

46. The system of claim 44 wherein the item includes merchandise.

47. The system of claim 44 further including a stored signal;

a reader that reads the second signal from the card; and logic conditionally maintaining the stored signal depending on a content of the second signal.

48. The system of claim 41 further including a time signal, wherein the writer writes the time signal.

49. The system of claim 48 further including a stored signal;

a reader that reads the second signal and the time signal from the card; and logic that conditionally maintains the stored signal depending on a content of the time signal.

50. The system of claim 41 further including a reader that reads the second signal from the card;

a sender that sends the read second signal to a processor, via a wide area communications path.

51. The system of claim 41 wherein the second signal includes a count of previous transactions.

52. The system of claim 41 wherein the second signal includes a quantity of signals dispensed to previous persons.

53. The system of claim 41 wherein the second signal includes a quantity of merchandise dispensed to previous persons.

54. The system of claim 41 wherein the second signal includes a quantity of tangible currency dispensed to previous persons.

55. The system of claim 41 wherein the second signal includes an amount of payment received from previous persons.

56. The system of claim 41 wherein the second signal includes a quantity of currency received from previous persons.

57. The system of claim 41 wherein the second item includes currency.

58. The system of claim 41 wherein the second item is tangible.

59. The system of claim 41 wherein the second item includes tangible currency.

60. A system for operating with first and second persons, and a card transported by the second person, the system comprising:

logic that begins a transaction for the second person by communicating a first signal with the card, the transaction being for transferring title to an item to the second person; and a reader that reads a second signal from the card, the second signal corresponding to a condition of another system, the condition resulting from a previous transaction between the other system and the first person.

61. The system of claim 60 further including a sender that sends the read second signal over a wide area communication link.

62. The system of claim 60 further the logic includes logic that sends an item to the second person.

63. The system of claim 62 wherein the item includes merchandise.

64. The system of claim 60 further including a stored signal; and logic for conditionally maintaining the stored signal depending on a content of the second signal.

65. The system of claim 60 wherein the system further includes a stored signal, and the system further includes a time signal;

a stored signal; and logic for conditionally maintaining the stored signal depending on a content of a time signal.

66. The system of claim 60 further including a sender that sends the second signal over a wide area communication path.

67. The system of claim 60 further including a processor that processes the second signal and displays a count of previous transactions.

68. The system of claim 60 further including a processor that processes the second signal and displays a quantity of signals dispensed.

69. The system of claim 60 further including a processor that processes the second signal and displays a quantity of merchandise dispensed.

70. The system of claim 60 further including a processor that processes the second signal and displays a quantity of tangible currency dispensed.

71. The system of claim 60 further including a processor that processes the second signal and displays an amount of payment received.

72. The system of claim 60 further including a processor that processes the second signal and displays a quantity of currency received.

73. The system of claim 60 wherein the item includes currency.

74. The system of claim 60 wherein the item is tangible.

75. The system of claim 60 wherein the item includes tangible currency.

76. A method for a system including a first person, a second person, a card transported by the second person, and a first system, the method comprising the steps, performed by the first system, of:

performing a first purchase transaction for the first person;

subsequently, beginning a second purchase transaction for the second person and communicating a first signal with the card; and writing a second signal onto the card, the second signal corresponding to a condition of the first system, the condition resulting from the first purchase transaction.

77. The method of claim 76 wherein the system further includes a second system, and the method further includes the steps, performed by the second system, of:

subsequently, reading the second signal from the card; and sending the second signal, read in the previous step, over a wide area communication link.

78. The method of claim 76 wherein the first purchase transaction includes transferring a tangible item to the first person.

79. The method of claim 76 wherein the system further includes a second system, and the method further includes the steps, performed by the second system, of:

subsequently, reading the second signal from the card; and conditionally maintaining a stored signal depending on a content of the second signal.

80. The method of claim 76 wherein writing the second signal includes writing a time signal.

81. The method of claim 80 wherein the system further includes a second system, and the method further includes the steps, performed by the second system, of:

subsequently, reading the second signal and the time signal from the card; and conditionally maintaining a stored signal depending on a content of the time signal.

82. The method of claim 76 wherein writing includes writing a count of previous purchase transactions.

83. The method of claim 76 wherein writing includes writing an amount of payment received in previous purchase transactions.

84. The method of claim 76 wherein writing includes writing a quantity of currency received in previous purchase transactions.

85. A method for a system including a first person, a second person, a card transported by the second person, a first system, and a second system, the method comprising the steps, performed by the second system, of:

beginning a purchase transaction for the second person by communicating a first signal with the card; and reading a second signal from the card, the second signal corresponding to a condition of the first system, the condition resulting from a previous purchase transaction between the first system and the first person.

86. The method of claim 85 further including sending the second signal over a wide area communication link.

87. The method of claim 85 further including sending an item from the second system to the second person.

88. The method of claim 87 wherein the item includes merchandise, and the sending step includes sending the merchandise to the second person.

89. The method of claim 85 wherein the system further includes a stored signal, and the method further includes conditionally maintaining the stored signal depending on a content of the second signal.

90. The method of claim 85 wherein the system further includes a stored signal, and the method further includes using the second signal to conditionally maintain the stored signal depending on a content of a time signal.

91. The method of claim 85 wherein reading includes reading a count of previous purchase transactions.

92. The method of claim 85 wherein reading includes reading an amount of payment received in previous purchase transactions.

93. The method of claim 85 wherein reading includes reading a quantity of currency received in previous purchase transactions.

94. A system for operating with first and second persons, and a card transported by the second person, the system comprising:

logic that performs a first purchase transaction for the first person, and subsequently begins a second purchase transaction for the second person and communicates a first signal with the card; and a writer for writing a second signal onto the card, the second signal corresponding to a condition of the system, the condition resulting from the first purchase transaction.

95. The system of claim 94 further including a detector that detects whether a person is using a card.

96. The system of claim 94 further including a reader that reads the second signal from the card; and a sender that sends the read second signal over a wide area communication link.

97. The system of claim 94 further including a time signal, wherein the writer writes the time signal.

98. The system of claim 94 wherein the second signal includes a count of previous purchase transactions.

99. The system of claim 94 wherein the second signal includes an amount of payment received from the previous persons.

100. The system of claim 94 wherein the second signal includes a quantity of currency received from previous persons.

101. A system for operating with first and second persons, and a card transported by the second person, the system comprising:

logic that begins a purchase transaction for the second person by communicating a first signal with the card; and a reader that reads a second signal from the card, the second signal corresponding to a condition of another system, the condition resulting from a previous purchase transaction between the other system and the first person.

102. The system of claim 101 further including a sender that sends the read second signal over a wide area communication link.

103. The system of claim 101 further including a stored signal; and logic for conditionally maintaining the stored signal depending on a content of the second signal.

104. The system of claim 101 wherein the system further includes a stored signal, and the system further includes a time signal;

a stored signal; and logic for conditionally maintaining the stored signal depending on a content of a time signal.

* * * * *